(12) United States Patent
Sinykin

(10) Patent No.: US 8,298,364 B2
(45) Date of Patent: Oct. 30, 2012

(54) METHODS OF MANUFACTURING PAINT ROLLER COVERS FROM A TUBULAR FABRIC SLEEVE

(75) Inventor: Daniel L. Sinykin, Bayside, WI (US)

(73) Assignee: Seamless Technologies, LLC, Janesville, WI (US)

( * ) Notice: Subject to any disclaimer, the term of this patent is extended or adjusted under 35 U.S.C. 154(b) by 1041 days.

(21) Appl. No.: 12/257,815

(22) Filed: Oct. 24, 2008

(65) Prior Publication Data
US 2009/0184188 A1   Jul. 23, 2009

Related U.S. Application Data

(63) Continuation-in-part of application No. 12/132,774, filed on Jun. 4, 2008, now Pat. No. 8,221,578, which is a continuation-in-part of application No. 12/100,050, filed on Apr. 9, 2008, which is a continuation-in-part of application No. 12/015,612, filed on Jan. 17, 2008, now Pat. No. 7,905,980.

(51) Int. Cl.
| | |
|---|---|
| A46D 1/00 | (2006.01) |
| B32B 5/00 | (2006.01) |
| B32B 37/00 | (2006.01) |
| B32B 38/04 | (2006.01) |
| D05C 15/00 | (2006.01) |
| D04H 13/00 | (2006.01) |
| B29C 65/00 | (2006.01) |
| C08J 5/00 | (2006.01) |
| A01B 29/00 | (2006.01) |
| B21B 1/40 | (2006.01) |
| E01C 19/23 | (2006.01) |
| B05C 11/00 | (2006.01) |
| B25F 5/00 | (2006.01) |

(52) U.S. Cl. ....... 156/309.6; 156/72; 156/148; 156/250; 492/28; 492/48

(58) Field of Classification Search ............... 156/60, 156/72, 84, 85, 86, 250, 267, 272.2, 275.7, 156/289, 296, 308.2, 309.6, 321, 325, 326, 156/327, 334, 148, 149, 155, 229; 264/103, 264/340, 345; 492/28, 29, 48; 29/895, 895.2; 15/230, 230.11
See application file for complete search history.

(56) References Cited

U.S. PATENT DOCUMENTS
1,791,741 A   2/1931   Moore
(Continued)

FOREIGN PATENT DOCUMENTS
DE          19824405 A1 * 12/1999
(Continued)

*Primary Examiner* — Philip Tucker
*Assistant Examiner* — Brian R Slawski
(74) *Attorney, Agent, or Firm* — Reinhart Boerner Van Deuren s.c.

(57) ABSTRACT

A method of manufacturing paint roller covers is disclosed in which the paint roller covers are manufactured from a seamless, tubular fabric sleeve knitted in a pile side-in manner and including at least one of a backing material and a pile made, at least in part, from a low melt fiber or yarn component. The seamless, tubular fabric sleeve is inverted to a pile side-out configuration, placed onto a cylindrical member, and heat is applied to cause the low melt fiber or yarn in the backing and/or looped ends of the pile to be activated and to closely conform to the size of the cylindrical member, thereby causing the melted and fused together, re-hardened low melt component of the seamless, tubular fabric sleeve to remain in a cylindrical configuration, forming an integrally formed core member.

34 Claims, 12 Drawing Sheets

U.S. PATENT DOCUMENTS

| | | | |
|---|---|---|---|
| 1,849,466 A | 3/1932 | Moore | |
| 2,600,955 A | 6/1952 | Barnes et al. | |
| 2,630,619 A | 3/1953 | Schmidt et al. | |
| 2,704,877 A | 3/1955 | Schmidt | |
| 2,737,702 A | 3/1956 | Schmidt et al. | |
| 2,752,953 A | 7/1956 | Schmidt | |
| 2,920,372 A | 1/1960 | Sannipoli et al. | |
| 2,944,588 A | 7/1960 | Sannipoli et al. | |
| 3,010,867 A | 11/1961 | Sannipoli et al. | |
| 3,181,233 A | 5/1965 | Sannipoli et al. | |
| 3,226,952 A | 1/1966 | Cassady | |
| 3,299,672 A | 1/1967 | Schmidt | |
| 3,732,135 A | 5/1973 | Ernst et al. | |
| 3,853,680 A | 12/1974 | Daniel | |
| 3,894,407 A | 7/1975 | Clingan et al. | |
| 3,894,409 A | 7/1975 | Clingan et al. | |
| 3,896,637 A | 7/1975 | Thore | |
| 4,236,286 A | 12/1980 | Abler et al. | |
| 4,245,487 A | 1/1981 | Schaab et al. | |
| 4,415,611 A | 11/1983 | Yamagata et al. | |
| 4,466,151 A | 8/1984 | Barch et al. | |
| 4,513,042 A | 4/1985 | Lumb | |
| 4,532,780 A | 8/1985 | Tilson et al. | |
| 4,546,020 A | 10/1985 | Sakai et al. | |
| 4,592,213 A | 6/1986 | Tilson et al. | |
| 4,692,975 A | 9/1987 | Garcia | |
| 4,798,748 A | 1/1989 | Kitamura et al. | |
| 5,206,968 A | 5/1993 | Bower et al. | |
| 5,294,276 A | 3/1994 | Linn et al. | |
| 5,339,484 A | 8/1994 | Polzin et al. | |
| 5,397,414 A * | 3/1995 | Garcia et al. | 156/187 |
| 5,431,029 A | 7/1995 | Kuhrau et al. | |
| 5,537,745 A * | 7/1996 | Musch et al. | 29/895.211 |
| 5,546,768 A | 8/1996 | Kuhrau et al. | |
| 5,572,790 A | 11/1996 | Sekar | |
| 5,577,402 A | 11/1996 | Kuhrau et al. | |
| RE35,526 E | 6/1997 | Alvarez Garcia | |
| 5,685,176 A | 11/1997 | Kuhrau et al. | |
| 5,694,688 A | 12/1997 | Musch et al. | |
| 6,016,670 A | 1/2000 | Kuhrau et al. | |
| 6,151,920 A | 11/2000 | Schindler et al. | |
| 6,159,134 A * | 12/2000 | Sekar | 492/13 |
| 6,159,320 A | 12/2000 | Tams et al. | |
| 6,203,648 B1 | 3/2001 | Barton et al. | |
| 6,324,717 B1 | 12/2001 | Sekar | |
| 6,502,779 B1 | 1/2003 | Jelinek et al. | |
| 6,615,490 B2 | 9/2003 | Polzin | |
| 6,685,121 B1 | 2/2004 | Jelinek et al. | |
| 6,766,668 B2 * | 7/2004 | Sinykin | 66/191 |
| 6,902,131 B1 | 6/2005 | Jelinek et al. | |
| 6,918,552 B2 | 7/2005 | Jelinek et al. | |
| 6,929,203 B1 | 8/2005 | Jelinek et al. | |
| 6,993,941 B2 | 2/2006 | Yamaguchi | |
| 2001/0036513 A1 * | 11/2001 | Capoccia | 427/429 |
| 2002/0042331 A1 | 4/2002 | Fortner et al. | |
| 2002/0091051 A1 | 7/2002 | Sekar | |
| 2002/0104358 A1 | 8/2002 | Hart | |
| 2002/0112810 A1 | 8/2002 | Polzin et al. | |
| 2003/0213083 A1 * | 11/2003 | Yamaguchi | 15/230 |
| 2007/0056132 A1 * | 3/2007 | Yamaguchi et al. | 15/230 |

FOREIGN PATENT DOCUMENTS

| | | |
|---|---|---|
| EP | 1074644 A1 * | 2/2001 |
| GB | 2236124 A * | 3/1991 |
| KR | 1020010074645 A | 8/2001 |

* cited by examiner

FIG. 12
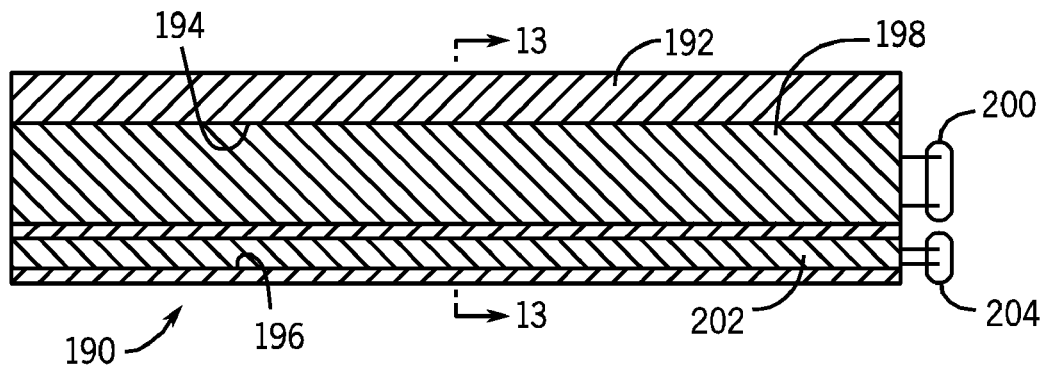
FIG. 13
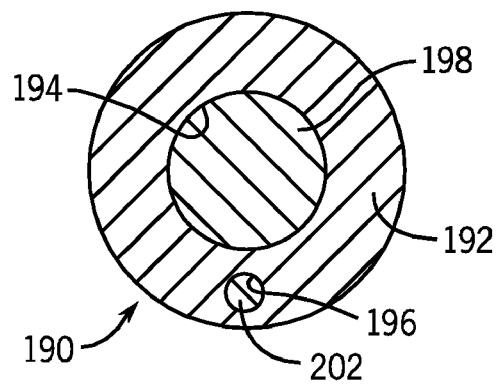
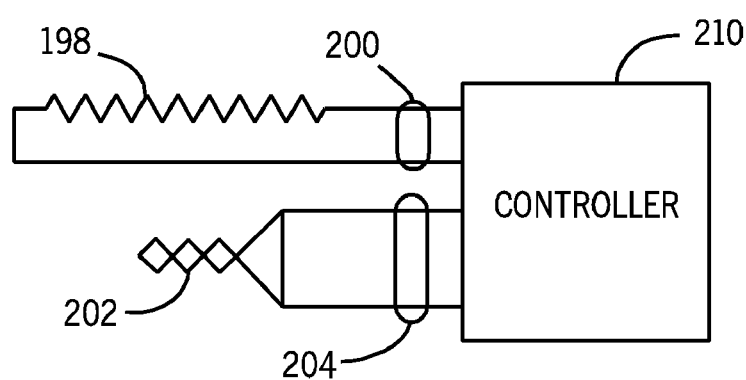
FIG. 14

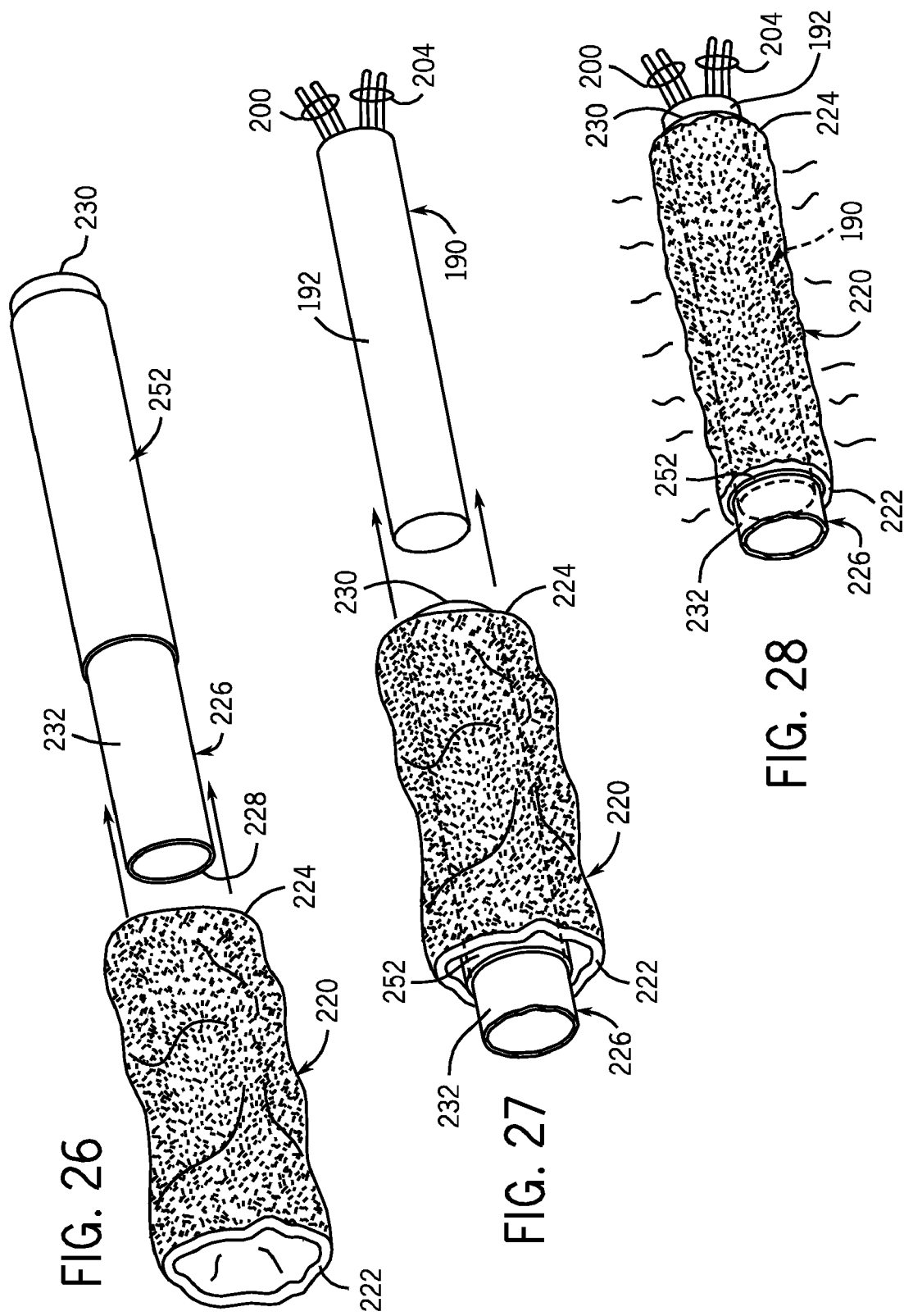

METHODS OF MANUFACTURING PAINT ROLLER COVERS FROM A TUBULAR FABRIC SLEEVE

IDENTIFICATION OF RELATED APPLICATION

This patent application is a continuation-in-part of U.S. patent application Ser. No. 12/132,774, filed on Jun. 4, 2008, now U.S. Pat. No. 8,221,578, entitled "Methods of Manufacturing Paint Roller Covers From a Tubular Fabric Sleeve," which is in turn a continuation-in-part of U.S. patent application Ser. No. 12/100,050, filed on Apr. 9, 2008, entitled "Methods of Manufacturing Paint Roller Covers From a Tubular Fabric Sleeve," which is in turn a continuation-in-part of U.S. patent application Ser. No. 12/015,612, filed on Jan. 17, 2008, now U.S. Pat. No. 7,905,980, entitled "Methods of Manufacturing Paint Roller Covers From a Tubular Fabric Sleeve," each of which patent applications are assigned to the assignee of the present invention, and each of which patent applications are incorporated herein by reference in their entirety.

BACKGROUND OF THE INVENTION

Field of the Invention

The present invention relates generally to the manufacture of paint roller covers, and more particularly to methods of manufacturing paint roller covers from a seamless, tubular fabric sleeve knitted in a pile side-in manner and having a backing constructed at least in part from a low melt material, and optionally, having a pile constructed at least in part from a low melt material.

The two inventions which have had the greatest impact on paint application are the invention of the paint roller in the 1930's and the development of water-based paint in the late 1940's. While water-based paints are easy to mix, apply, and clean up, there is little doubt that the paint roller has been the greatest single time saving factor in the paint application process, allowing large surfaces to be painted with a uniform coat of paint quickly and easily. Typically, paint rollers are comprised of two components, namely a handle assembly and a paint roller cover for installation onto the handle assembly.

The handle assembly consists of a grip member having a generally L-shaped metal frame extending therefrom, with the free end of the metal frame having a rotatable support for a paint roller cover mounted thereon. The paint roller cover consists of a thin, hollow cylindrical core which fits upon the rotatable support of the handle, with a plush pile fabric being secured to the outer diameter of the paint roller cover. The core may be made of either cardboard or plastic material, with which material is used for the core generally being determined based upon the selling price of the paint roller cover. The pile fabric is traditionally applied as a strip which is helically wound onto the outer surface of the core with adjacent windings of the fabric strip being located close adjacent each other to provide the appearance of a single continuous pile fabric covering on the core.

Typically, the pile fabric is a dense knitted pile fabric, which may be knitted from natural fibers such as wool or mohair, synthetic fibers such as polyester, acrylic, nylon, or rayon, polypropylene or from a blend of natural and synthetic fibers. The knitting is typically performed on a circular sliver knitting machine, which produces a tubular knitted backing or base material with a pile knit on the inside of the tubular segments which are approximately fifty-eight inches (1473 millimeters) in circumference by thirty to fifty yards (27.43 meters to 45.728 meters) long (depending on fabric weight).

Generally, sliver knitting is a knitting process which locks individual pile fibers directly into a lightweight knit backing or base material in a manner wherein the pile fibers extend from one side of the knit base material. The knit base material itself is made from yarn, which may be knitted in a single jersey circular knitting process on a circular knitting machine, with closely packed U-shaped tufts of the fibers being knitted into the knit base material which anchors them in the completed pile fabric. The free ends of the fibers extend from one side of the knit base material to provide a deep pile face. The knit base material is typically made of synthetic yarns, with the pile being made of a desired natural or synthetic fiber, or a blend of different fibers.

Such fabrics are illustrated, for example, in U.S. Pat. No. 1,791,741, to Moore, U.S. Pat. No. 2,737,702, to Schmidt et al., U.S. Pat. No. 3,226,952, to Cassady, U.S. Pat. No. 3,853,680, to Daniel, U.S. Pat. No. 3,894,409, to Clingan et al., U.S. Pat. No. 4,236,286, to Abler et al., U.S. Pat. No. 4,513,042, to Lumb, and U.S. Pat. No. 6,766,668, to Sinykin, all of which patents are hereby incorporated herein by reference. Sliver knit high pile fabrics have been widely used for many years in the manufacture of imitation fur fabrics, and also have found use, for example, as linings for overcoats and footwear, as coverings for stuffed toys and floors, in applications in pet beds, case liners, boot and slipper liners, medical pads, and blankets, and, of course, as coverings for paint roller covers.

The components of the knitted fabric are a yarn, which is used to knit the fabric's knit base material, and fibers which are supplied in a "sliver" rope, which consists of fibers which are all longitudinally oriented in a rope which is typically less than three inches (76 millimeters) in diameter. The fibers are loose fibers of either a single type or a uniform blend of multiple types of fibers. The fiber mix will determine the performance, density, texture, weight, patterning, and color of the finished pile fabric.

The fibers are typically blown together in an air chamber to blend them, and then are carded in carding machines that "comb" the fibers to align them in parallel with each other. The fibers are then gathered into a soft, thick rope which is called "sliver" (which is the derivation for the term "sliver knit") or "roving." The yarn and the sliver are supplied to the circular knitting machine, which typically has eighteen heads and produces a tubular knit pile fabric which is approximately fifty-eight inches (1473 millimeters) in circumference. (Thus, when the tubular knit pile fabric is slit longitudinally, the fabric is approximately fifty-eight inches (1473 millimeters) wide.)

Such knitting machines are well known in the art, and are illustrated in U.S. Pat. No. 3,894,407, to Clingan et al., U.S. Pat. No. 3,896,637, to Thore, U.S. Pat. Nos. 4,532,780 and 4,592,213, both to Tilson et al., U.S. Pat. Nos. 5,431,029, 5,546,768, 5,577,402, 5,685,176, and 6,016,670, all to Kukrau et al., and U.S. Pat. No. 6,151,920, to Schindler et al., all of which patents are hereby incorporated herein by reference. Examples of commercial versions of such knitting machines are the Model SK-18 Sliver Knitter and the Model SK-18J Sliver Knitter which are available from Mayer Industries, Inc. of Orangeburg, S.C.

The first commercial circular sliver knitting machine had seven heads, and commercially-available circular knitting machines today have between seven and eighteen heads. Eighteen head knitting machines have upwards of one thousand needles, and produce tubular knitted segments that are approximately nineteen inches (483 millimeters) in diameter (fifty-eight inches (1473 millimeters) in circumference). All of these circular sliver knitting machines produce tubular knitted pile fabric segments having the pile located on the inside. Such circular sliver knitting machines are incapable of either producing tubular knitted pile fabric segments having the pile on the outside or small diameter tubular knitted pile fabric segments.

Following the manufacture of the tubular knitted pile segments on a circular sliver knitting machine, the tubular knitted pile segments are slit longitudinally to produce extended knitted pile segments of fabric which are typically fifty-eight inches (1473 millimeters) wide by thirty to fifty yards (27.43 meters to 45.728 meters) long. These extended knitted pile segments of fabric are then tensioned longitudinally and transversely, stretched to a sixty inch (1524 millimeter) width or greater to guarantee the proper number of two and seven-eighth inch (73 millimeter) strips, and back coated (on the non-pile side of the knit base material) with a stabilized coating composition such as a clear acrylic polymer. The coating composition which is coated onto the non-pile side of the knit base material is then processed, typically by heat, to stabilize the coated, extended knitted pile segment. The heating operation dries and bonds the coating composition to the knit base material, producing a fabric which is essentially lint-free.

The coated, extended knitted pile segment can then be subjected to a shearing operation to achieve a uniform pile length, with the sheared fibers being removed by vacuum, electrostatically, or by any other known removal technique. The pile density, the nap length, and the stiffness of the fibers are varied based upon custom specifications and the particular characteristics of the paint roller cover that are desired.

The sheared, coated, extended knitted pile segment is then slit into a plurality of two and seven-eighths inch (73 millimeter) wide knitted pile fabric strips, of which there are typically twenty for a sixty inch (1524 millimeter) wide fabric segment. During this slitting operation, the strips may be vacuumed to remove stray fibers and lint. The knitted pile fabric strips are rolled onto a core to produce twenty rolls of knitted pile fabric strips, each of which is thirty to fifty yards long. These rolls of knitted pile fabric strips may then be shipped to a paint roller cover manufacturer. Alternately, a plurality of standard lengths of the fabric may be seamed together to produce an extended length fabric strip which may be helically wound in consecutive rows upon a core as taught in U.S. Pat. Nos. 6,502,779, 6,685,121, 6,902,131, 6,918,552, and 6,929,203, all to Jelinek et al., all of which patents are hereby incorporated herein by reference.

Both the standard length rolls of knitted pile fabric strips and the rolls of extended length knitted pile fabric strips have substantial material costs and labor costs that are incurred in the manufacturing process after the circular knitting process. The material costs include the cost of the coating material, losses due to fly (fly are extra fibers that come loose from the knitted pile fabric), losses during the cutting of the sixty inch (1524 millimeter) wide fabric segment into twenty knitted pile fabric strips, and seam losses throughout the operation. The labor costs include the costs to perform the coating process, the brushing, the second pass shearing, and all of the finishing steps within the traditional sliver knit operation including slitting and continuously coiling the fabric slits.

Paint roller covers are manufactured by using a hollow cylindrical core made of cardboard or thermoplastic material which has the knitted pile fabric strip helically wound around the core. During the manufacture of paint roller covers, the knitted pile fabric strips are secured to the core either by using adhesive or epoxy, or by thermally bonding the knitted pile fabric strip in place on a thermoplastic core. For examples of these manufacturing processes see U.S. Pat. No. 4,692,975, to Garcia (the "'975 Patent"), U.S. Pat. No. 5,572,790, to Sekar (the "'790 Patent"), and U.S. Pat. No. 6,159,320, to Tams et al. (the "'320 Patent"), each of which are hereby incorporated by reference.

The '975 Patent uses a core that is cut from preformed thermoplastic (e.g., polypropylene) tubular stock. The core is mounted on a rotating spindle, and a movable carriage mounted at an angle to the spindle feeds a continuous strip of knitted pile fabric onto the core, with the carriage moving parallel to the spindle in timed relation to its rotation so that the knitted pile fabric strip is wound on the plastic core in a tight helix. Also mounted to the movable carriage is a heat source for heat softening the thermoplastic core just in advance of the point where the knitted pile fabric strip is applied to the thermoplastic core, such that the knitted pile fabric is heat bonded to the thermoplastic core as it is wound thereupon. The bond formed between the knitted pile fabric and the thermoplastic core is a strong one not subject to separation from exposure to paint solvents.

The '790 Patent uses a core that is formed from a strip (or multiple strips) of thermoplastic material that is (are) helically wound about a stationary mandrel. Alternately, the core may be formed by applying liquefied thermoplastic material to a drive belt which transfers the thermoplastic material to the mandrel. A layer of adhesive is then applied to the outer surface of the core, and the knitted pile fabric strip is applied to the core by helically winding the knitted pile fabric strip onto the core. Alternately, the paint roller cover may instead be made by bonding, in a single step, a knitted pile fabric strip to a wound strip of thermoplastic material that is wrapped about the mandrel.

The '320 Patent extrudes a cylindrical plastic core through a rotating extruder head that is cooled, with the outer surface of the core then being plasma treated. The knitted pile fabric strip is secured onto the plasma treated outer surface of the core by extruding thin films of first and second epoxy resin subcomponents onto the outer surface of the core as it is extruded, cooled, and plasma treated in a continuous process.

Other variations are also known, particularly in technologies relating to manufacturing pile fabric suitable for use on paint roller covers. For example, instead of using knitted pile fabric, woven pile fabric can be substituted. Woven pile fabric consists of three yarns—a knit base material or warp yarn, a filling or weft yarn, and a pile yarn. The threads of warp yarn are held taut and in a parallel array on a loom, and the threads of weft yarn are woven across the threads of warp yarn in an over/under sequence orthogonal to the threads of warp yarn, with threads of pile yarn being woven into the weave of warp and weft yarns such that the threads of pile yarn extend essentially perpendicularly from one side of the fabric. Such woven pile fabric may be processed in a manner similar to that described above with regard to the processing of knitted pile segments of fabric to produce strips of woven pile fabric that can be helically wound onto paint roller cover cores.

However, all paint roller covers manufactured using the methods described above have a seam. As the strips of fabric are helically wound around the cores, the fabric strips wrap contiguously around the core, thereby creating a helical seam that is located throughout the cover. The seam inevitably produces a less than optimal paint roller cover since a seam can interfere with the uniform application of paint from the paint roller cover. The helical winding process of manufacturing a paint roller cover requires careful attention to contiguous winding. Errors resulting in overlapped fabric or gaps in the contiguous winding process often occur, resulting in increased scrap or marketing poor quality covers. Such seams have the potential, particularly with short nap paint roller covers, to produce a seam mark or stippling effect on the surface being painted, particularly if the paint being applied combines with the seams to produce a more pronounced defective characteristic in the surface being painted.

An examination of prior technology in the paint roller cover arts reveals that this problem has been recognized in the past, with several solutions that have been proposed to deal with the challenge presented by the presence of seams in paint roller covers. The first of these, U.S. Pat. No. 2,600,955, to Barnes et al., which patent is hereby incorporated herein by reference, discloses a paint roller cover made from a segment of canvas tubing that has yarn loops sewn therethrough, with the ends of the loops on the outside of the segment of the canvas tubing being cut. This approach is certainly far too expensive to represent a viable solution, and would not compare well to currently commercially available paint roller covers in the quality of the paint coat that could be applied.

Another approach is shown in U.S. Pat. Nos. 2,704,877 and 2,752,953, both to Arnold Schmidt, which patents are hereby incorporated herein by reference, which patents are related and disclose a tubular knitted pile fabric that is stated to have been manufactured on an apparatus disclosed in U.S. Pat. No. 1,849,466, to Moore, which patent is hereby incorporated herein by reference. The apparatus disclosed in Moore, which was hand operated, was stated in several related patents to Sannipoli et al. (U.S. Pat. Nos. 2,920,372, 2,944,588, and 3,010,867, which patents are hereby incorporated herein by reference) to be capable of manufacturing a seamless tubular knitted sleeve in which the pile is located on the interior of the sleeve, thereby requiring that the sleeve be inverted prior to mounting it on a core to form a paint roller cover. As such, the apparatus disclosed in Moore is incapable of manufacturing a knitted sleeve in which the pile is located on the exterior of the sleeve.

The Sannipoli et al. patents inverted the tubular knitted sleeve by positioning it within a hollow tube and pulling one end of the tubular knitted sleeve around the end of the tube and pushing successive portions of the tubular knitted sleeve along the outside of the tube. The Arnold Schmidt '877 patent (which failed to disclose how it inverted the knitted sleeve with the pile on the interior thereof) disclosed a machine for treating and shearing inverted tubular knitted sleeves, and the Arnold Schmidt '953 Patent disclosed using the inverted, treated, and sheared tubular knitted sleeves by stretching them and pulling them over a tube or shell to form a paint roller.

The problem that has prevented the inventions of the Arnold Schmidt patents and the Sannipoli et al. patents from being either practical or commercially successful is that the process of inverting a tubular knitted sleeve having the pile on the interior of the sleeve inevitably damages the fabric of the tubular knitted sleeve. When the fabric is inverted, the material of the fabric is deformed due to stretching that occurs during the process of inverting the tubular knitted sleeve. This deformation tends to increase the diameter of the tubular knitted sleeve, thus requiring it to be stretched lengthwise to restore it to its former diameter. Not only is this process difficult and expensive, but it also results in variable density of the fabric as well as introducing the prospect of adhesive or thermoplastic bleed-through within the stitches. Such problems will result in unacceptable product quality in paint roller covers made from this type of fabric.

It has been determined that the inverting approach taught by the Sannipoli et al. patents and useable by the Arnold Schmidt patents has three drawbacks that make it impracticable. The first drawback of the inverting method is that it requires a high degree of manual operation in that it requires cutting of the tubular knitted sleeves to size and placement of the tubular knitted sleeves into the tubes of the inverting machine. The second drawback of the Sannipoli et al. method is that only relatively short length tubular knitted sleeves representing a single paint roller cover (typically nine inches (229 millimeters)) can be processed at a time, which makes the method inherently unsuitable for mass production.

The third, and by far the most serious, drawback of the Sannipoli et al. method is that the process of inverting the tubular knitted sleeves inevitably results in stretching the tubular knitted sleeves so that they will not snugly fit on the paint roller cover cores, potentially creating creases in a high percentage of them when they are adhesively secured to the paint roller cover cores. This results in an unacceptably high percentage of them being defective and necessitating them being scrapped, resulting in an unacceptably high scrap cost. Predictably, the inventions taught in the Sannipoli et al. patents and the Arnold Schmidt patents have never found commercial acceptance due to these serious disadvantages.

It would therefore be desirable to provide a tubular knitted fabric manufactured on a conventional knitting machine, such as one of the above-described apparatus and methods, that is knitted pile side-in, but that can be inverted to a pile side-out configuration and be utilized in the manufacture paint roller covers. More specifically, there is a need to manufacture paint roller covers from a tubular knitted fabric manufactured in a pile side-in manner that does not result in a paint roller cover having wrinkles and/or a deformed pile outer surface. It is highly desirable that the manufacturing method results in an acceptable pile which extends from an acceptably rigid core that can be installed on and used with any conventional paint roller frame.

The method used to manufacture a paint roller cover from the tubular pile fabric must result in a construction which is both durable and long lasting, and which, when accomplished, should yield a paint roller cover of superior quality. In order to enhance the market appeal of the method of the present invention, it should also minimize the cost of manufacture of paint roller covers when compared to conventional methods of manufacturing paint roller covers to thereby afford it the broadest possible market. Finally, it is also desirable that all of the aforesaid advantages and aspirations of the paint roller cover manufacturing method of the present invention be achieved without incurring any substantial relative disadvantage.

SUMMARY OF THE INVENTION

The disadvantages and limitations of the background art discussed above are overcome by the present invention. With this invention, a method of manufacturing paint roller covers from a tubular knitted fabric that is knitted pile side-in is provided. The tubular knitted fabric segment includes a knit base material knitted from a backing yarn and an inwardly facing pile comprising sliver fibers, cut yarn pile segments or a combination thereof. At least one of the backing yarn and the pile is made, at least in part, from a low melt material and/or a special kind of yarn made from bicomponent fibers.

Bicomponent fibers are comprised of two polymers that have different chemical and/or physical properties and which are extruded from the same extrusion device with both polymers contained within the same fiber. Most commercially available bicomponent fibers are configured with their two constituent polymers arranged either in a sheath-core arrangement, a side-by-side arrangement (also referred to as a bilateral arrangement), an eccentric sheath-core arrangement (which is a geometric variation of sheath-core construction), a matrix-fibril arrangement (also referred to as an inlands-in-the-sea arrangement), and a segmented pie arrangement (also referred to as a citrus arrangement). The bicomponent fibers used by the present invention are "low melt" bicomponent thermal binder fibers that utilize polymer combinations such as a sheath-core arrangement in which the core material has a relatively higher melting point than the sheath material. These alternatives are examples, since many other low-melt configurations can also be manufactured. (It will be appreciated that the low melt yarn can be made from more than two polymer constituents, as is well known to those skilled in the art, and as described below.)

Such low melt bicomponent fibers are available from Fiber Innovation Technology, Inc. of Johnson City, Tenn., and from Kuraray Co., Ltd, of Tokyo, Japan. Typical higher melt (which may be used in a core) materials are polyester (most preferred) or polypropylene, and typical sheath materials are polyethylene terephthalate (PET, most preferred), polyethylene, and copolyester. Typical lower melt (which may be used in a sheath) melting points of bicomponent fibers may be between approximately 121 and 260 degrees Centigrade (between 250 and 500 degrees Fahrenheit).

The backing yarn and/or the pile fiber/yarn used by the present invention may thus be made of such low melt bicomponent fibers; such yarn shall be referred to herein as "bicomponent fiber yarn." Alternately, the backing yarn and/or pile fiber may instead be a bicomponent yarn which is made of two different types of fibers or yarns (yarns can be manufactured using different types of fibers or ring spun with two different types of yarn), one of which fiber or yarn types has a lower melting point than the other fiber or yarn type; this yarn shall be referred to herein as "bicomponent yarn." The bicomponent fiber yarn and the bicomponent yarn shall collectively be referred to herein as "low melt yarns."

Consistent with the broader aspects of the present invention, the term "low melt yarn" can encompass yarns including at least one low melt filament or strand, as described above, and also including a plurality of additional high melt or non-low melt filaments or strands that are combined together by methods well known to those skilled in the art. The additional high melt/non-low melt filaments or strands may be comprised of any suitable natural or synthetic fiber suitable for combination with the low melt fiber or strand. Suitable materials include but are not limited to nylon, rayon, polypropylene, polyester, polyester-cotton blends, cotton, wool and acrylic. Other materials may be used so long as they are compatible with the selected low melt yarn and the final application of the tubular knitted pile fabric segment. In this way, the present invention is not limited to low melt yarns having only two components and includes low melt yarns having multiple strand components.

It will be appreciated that the ratio of low melt component to high melt component used in a particular low melt yarn encompassed by the present invention, will vary depending on the particular end use application of the tubular knitted pile fabric segment. Where a more rigid integral core is to be formed, a low melt yarn having a low melt fiber or strand composition that is substantially equal to or greater than the high melt component composition can be used. For applications where the integral core of the tubular knitted pile fabric segment may be further reinforced, a low melt fiber or strand composition that is less than the high melt component composition can be used.

The linear mass density of the backing yarn, the pile fibers and/or cut yarn segments used by the present invention may vary between approximately 150 denier and approximately 1500 denier, with a preferred linear mass density being between approximately 560 denier and approximately 1200 denier. It will be understood, however, that the linear mass density of each fiber or strand of the bicomponent or multi-component low melt yarn will be determined by the specific fiber/strand selected, and is a matter of design choice, depending at least in part on the knitting equipment utilized and the end use application of the tubular knitted pile fabric segment.

The use of low melt yarns for the base of a sliver knit fabric is discussed in U.S. Pat. No. 6,766,668, to Sinykin, which patent is assigned to the assignee of the present invention, and which patent is hereby incorporated herein by reference in its entirety. This patent used heat to activate the low melt material in the base, heating the sliver knit fabric to a temperature for a sufficient period of time to permit the low melt material to melt about the central and/or intermediate portions of the sliver fibers. The sliver knit fabric was then cooled so that the low melt material returned to a hardened state and captured a portion of the sliver fibers to lock them to the base of the fabric. This represents a substantially different use of bicomponent fibers than that of the present invention, as will become evident below.

The low melt yarn backing and/or the low melt sliver fibers, cut pile yarn segments or a combination of both sliver fibers and cut pile yarn segments are knitted in a pile side-in manner into the tubular knitted pile fabric segment by methods known to those skilled in the art. Non-limiting examples of such manufacturing methods and apparatus are disclosed in the above-incorporated by reference U.S. Pat. Nos. 2,704,877 and 2,752,953, both to Arnold Schmidt, U.S. Pat. No. 1,849,466, to Moore, and/or U.S. Pat. Nos. 2,920,372, 2,944,588, and 3,010,867, to Sannipoli et al., each of which discloses a seamless tubular knitted sleeve manufactured so that the pile is located on the interior of the sleeve.

The pile side-in tubular knitted fabric of the present invention is cut into the desired length or size and then inverted for further processing to form the tubular knitted pile fabric segment having an integrally formed paint roller core of the present invention.

The tubular knitted pile fabric is then placed onto a cylindrical mandrel which is the approximate size of the inner diameter of a paint roller cover (typically approximately one and one-half inches (38 millimeters)). The cylindrical mandrel may be made, for example, of steel (which may optionally have a non-stick coating such as PTFE or silicone) and has a heating mechanism contained inside which is capable of rapidly heating the outside of the mandrel to a desired temperature. The cylindrical mandrel is heated to the desired temperature, which is less than about 343 degrees Centigrade (less than 650 degrees Fahrenheit) or any temperature suitable for activating the low melt yarn. One temperature range that may be acceptable is between approximately 121 and 218 degrees Centigrade (between 250 and 425 degrees Fahrenheit). This temperature is sufficient to melt the lower melting point component of the low melt yarn used in the backing or base and/or the looped ends of any pile fibers also including a low melt component. The temperature is maintained for a period of between approximately five seconds and approximately ninety seconds, preferably approximately five to approximately sixty seconds.

The melted lower melting point component of the low melt yarn used in the backing or base of the tubular knitted pile fabric and/or the melted looped ends of the pile fibers flow into the cylindrical form of the outside of the cylindrical mandrel. The melted lower melting point component also flows between the high melt backing loops and the central and/or intermediate portions of the sliver fibers or the loops of the cut pile yarn segments, and locks the sliver fibers or cut pile yarn segments into the tubular knitted pile fabric. This greatly reduces the degree of shedding of pile fibers from the tubular knitted pile fabric. It also converts the backing from a fabric into a unitary cylindrical assembly which, when cooled, will become substantially rigid. The mandrel is then cooled or allowed to cool, after which the rigid, cylindrical pile fabric assembly is removed from the mandrel.

In a first alternate embodiment, one or more layers of a dry adhesive film may be first wound on a non-stick mandrel, following which the tubular knitted pile fabric segment is placed over the dry adhesive film. The mandrel is then heated to cause the dry adhesive film and the lower melting point component of the low melt yarn used in the backing or base of the tubular knitted pile fabric to melt together with the adhesive bonding material to create an even more rigid cylindrical assembly having a pile surface.

In a second alternate embodiment, a layer of spray adhesive is sprayed on to the cooled, substantially rigid integral core formed by the re-hardened low melt yarn to create an enhanced rigid cylindrical assembly having a pile surface.

The rigid, cylindrical pile fabric assembly is finished by combing and shearing the pile fabric to the desired length. The edges of the unfinished paint roller covers are beveled, and any loose sliver fibers are then vacuumed off. The finishing of the rigid, cylindrical pile fabric assembly may be performed using the MBK Maschinenbau GmbH paint roller cover finishing machine, an Edward Jackson (Engineer) Limited finishing machine, or other equipment custom built by individual paint roller cover manufacturers.

It may therefore be seen that the present invention teaches a method by which a paint roller cover may be manufactured from tubular knitted pile fabric using a base or backing and pile fibers comprising, at least in part, a low melt yarn.

The paint roller cover manufacturing method of the present invention results in an acceptable pile which extends from an acceptably rigid core which can be installed on and used with any conventional paint roller frame, or on a frame uniquely designed for the paint roller utilizing the new core design. The paint roller cover manufacturing method of the present invention facilitates either the manufacture of a paint roller cover of a desired finished length, or the manufacture of an extended length segment from which segments of any desired size can be cut for finishing as paint roller covers, thereby facilitating the mass manufacture of paint roller covers. The paint roller cover manufacturing methods of the present invention can use tubular sliver knitted pile fabric, tubular knitted yarn cut pile fabric, tubular knitted fabric including both sliver knitted pile and cut pile yarn, as well as a number of different backing materials.

The paint roller cover manufacturing method of the present invention results in a construction which is both durable and long lasting, and yields a paint roller cover of superior quality. The paint roller cover manufacturing method of the present invention also reduces the cost of manufacturing paint roller covers when compared to conventional methods of manufacturing paint roller covers by manufacturing paint rollers without using a core member, thereby affording it the broadest possible market. Finally, all of the aforesaid advantages and aspirations of the paint roller cover manufacturing method of the present invention are achieved without incurring any substantial relative disadvantage.

DESCRIPTION OF THE DRAWINGS

These and other advantages of the present invention are best understood with reference to the drawings, in which:

FIG. 6 is a cross sectional view of a sheath-core bicomponent fiber having a core made of a material that has a higher melting point than the material that its sheath is made of;

FIG. 12 is a longitudinal cross sectional view of a mandrel heating assembly having a cartridge heater and a thermocouple located inside a cylindrical mandrel;

FIG. 13 is a lateral cross sectional view of the mandrel heating assembly shown in FIG. 12;

FIG. 14 is a schematic depiction of a controller that uses the signal from the thermocouple illustrated in FIG. 12 to control the cartridge heater also illustrated in FIG. 12;

FIG. 26 is a schematic isometric depiction showing an end of a tubular knitted pile fabric about to be slid onto the one or more windings of dry adhesive film on the aluminum heating tube shown in FIG. 25;

FIG. 27 is a schematic isometric depiction of the tubular knitted pile fabric, the one or more windings of dry adhesive film, and the aluminum heating tube illustrated in FIG. 26 about to be slid onto the mandrel heating assembly;

FIG. 28 is a schematic isometric depiction of the tubular knitted pile fabric, the one or more windings of dry adhesive film, and the aluminum heating tube illustrated in FIGS. 26 and 27 located upon the mandrel heating assembly illustrated in FIG. 27 and being heated.

DETAILED DESCRIPTION OF THE PREFERRED EMBODIMENT

The paint roller cover manufacturing methods of the present invention uses a tubular paint roller fabric that may be a tubular knit base having sliver pile fibers extending inwardly therefrom, a tubular knit base having cut pile yarn segments extending inwardly therefrom or a tubular knit base having a combination of sliver pile fibers and cut pile yarn segments extending inwardly therefrom. At least one of the tubular knit base and the sliver fibers/cut yarn pile is made, at least in part, of a low melt yarn. As illustrated in the following Figures and as described in more detail herein, the methods of the present invention can be used with good effect on tubular knit fabrics knitted in a pile side-in manner and having any type of pile fibers, as will be known to those skilled in the art, provided that the knit base and/or the pile fibers comprise, at least in part, a low melt yarn or fiber component.

Figure 1:
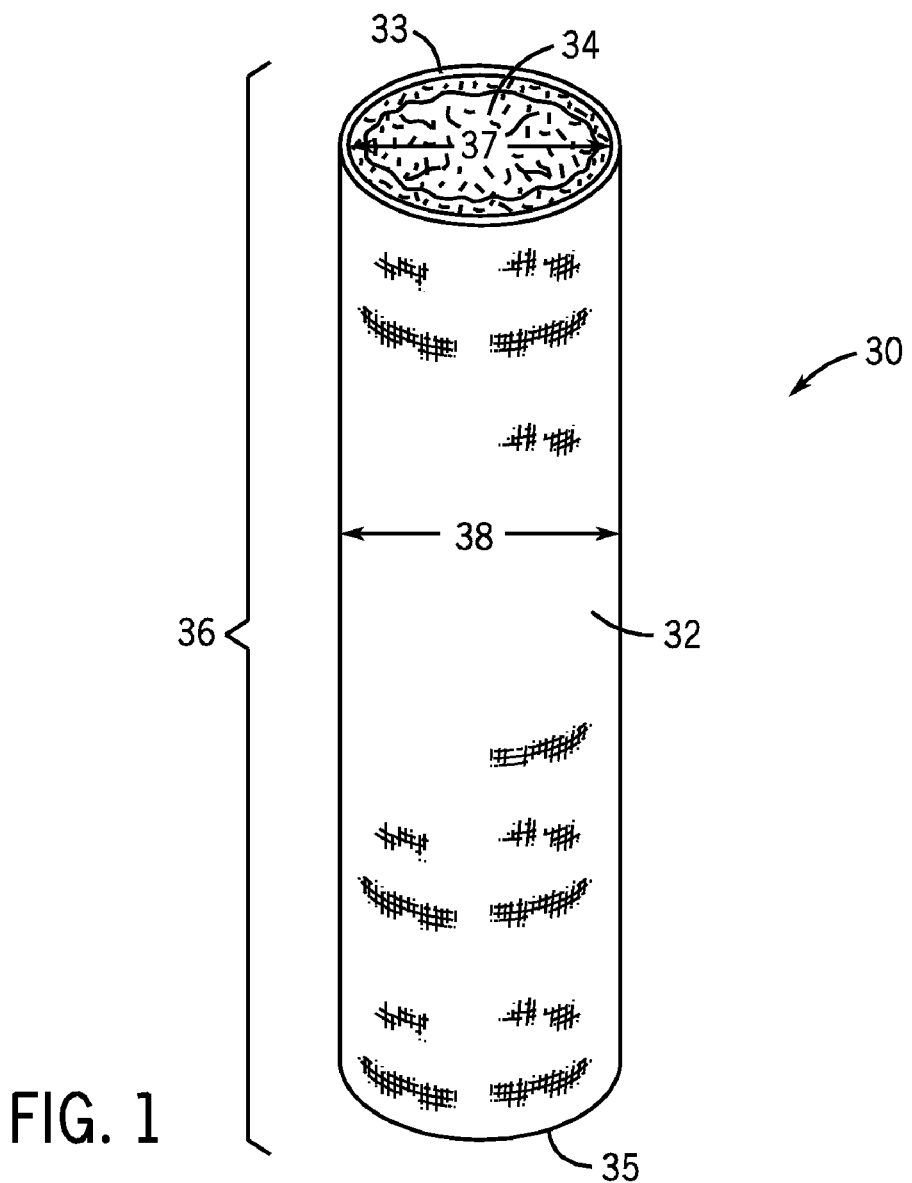
FIG. 1 is an isometric view of a segment of tubular paint roller fabric made according to the teachings of the present invention, with the pile extending inwardly, showing a tubular knit base having pile fibers extending inwardly therefrom.
Figure 2:
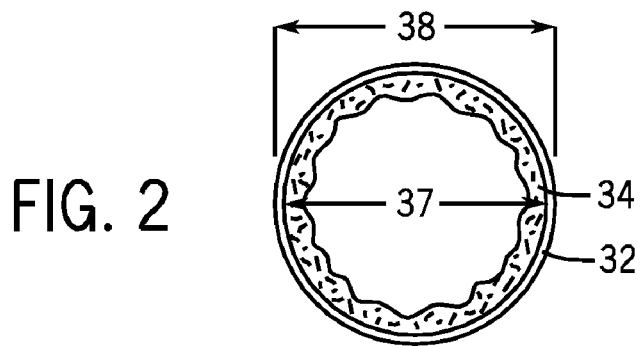
FIG. 2 is cross sectional view of the segment of pile side-in tubular knitted paint roller fabric illustrated in FIG. 1, showing the inner and outer diameters of the tubular fabric.

Referring first to FIGS. 1 and 2, an exemplary tubular knit segment 30 that may be continuously knitted in an extended length is shown in a pile side-in configuration. Such an extended length tubular fabric segment 30 can be manufactured by any method known to those skilled in the art, including but not limited to those manufactured as described in detail in the above-incorporated by reference U.S. Pat. Nos. 2,704,877 and 2,752,953, both to Arnold Schmidt, U.S. Pat. No. 1,849,466, to Moore, and/or U.S. Pat. Nos. 2,920,372, 2,944,588, and 3,010,867, to Sannipoli et al., each of which discloses a seamless tubular knitted sleeve manufactured so that the pile is located on the interior of the sleeve.

The pile side-in tubular knit segment 30 includes a knit backing or base material indicated generally at 32 having pile fibers indicated generally at 34 extending from the knit base material 32 on the interior surface of the tubular knit segment 30. The knit base material 32 can comprise, at least in part, a low melt yarn that will be discussed below. In certain other embodiments of the present invention, the pile fibers 34 can also comprise, at least in part, low melt yarn. As will be appreciated by those skilled in the art, at least one of the knit base material 32 and the pile fibers 34 include a low melt yarn. The pile side-in tubular knit segment 30 includes a top edge 33, a bottom edge 35 and a length 36 extending therebetween. It will be appreciated that the pile side-in tubular knit segment 30 may be knitted in as long a length as desired, notwithstanding that FIG. 1 only shows a relatively short piece of the pile side-in tubular knit segment 30.

As best illustrated in FIG. 2, the pile side-in tubular knit segment 30 has an essentially circular cross section and is formed to have an inner diameter 37 and an outer diameter 38. As will be appreciated, the pile side-in tubular knit segment 30 is manufactured to have a substantially uniform inner diameter 37 and outer diameter 38 along its entire length 36. The pile side-in tubular knit segment 30 is manufactured to have an inner diameter that is preferably sized so that when it is inverted, it will be of a size that substantially corresponds to a typical paint roller cover. As such, the inner diameter 37 can be about one and one-half inches (38 millimeters), although depending on the type of end use paint roller application, the pile side-in tubular knit segment 30 can be manufactured to have a smaller or larger inner diameter.

It will be understood that FIGS. 1 and 2 are representative of a typical construction for a pile side-in tubular knit fabric that can be used in the methods and paint roller covers of the present invention. Examples of variations of the knit base 32 and pile fiber 34 constructions for use in the pile side-in tubular knit segment 30 are described in more detail with respect to FIGS. 3 through 5.

Figure 3:
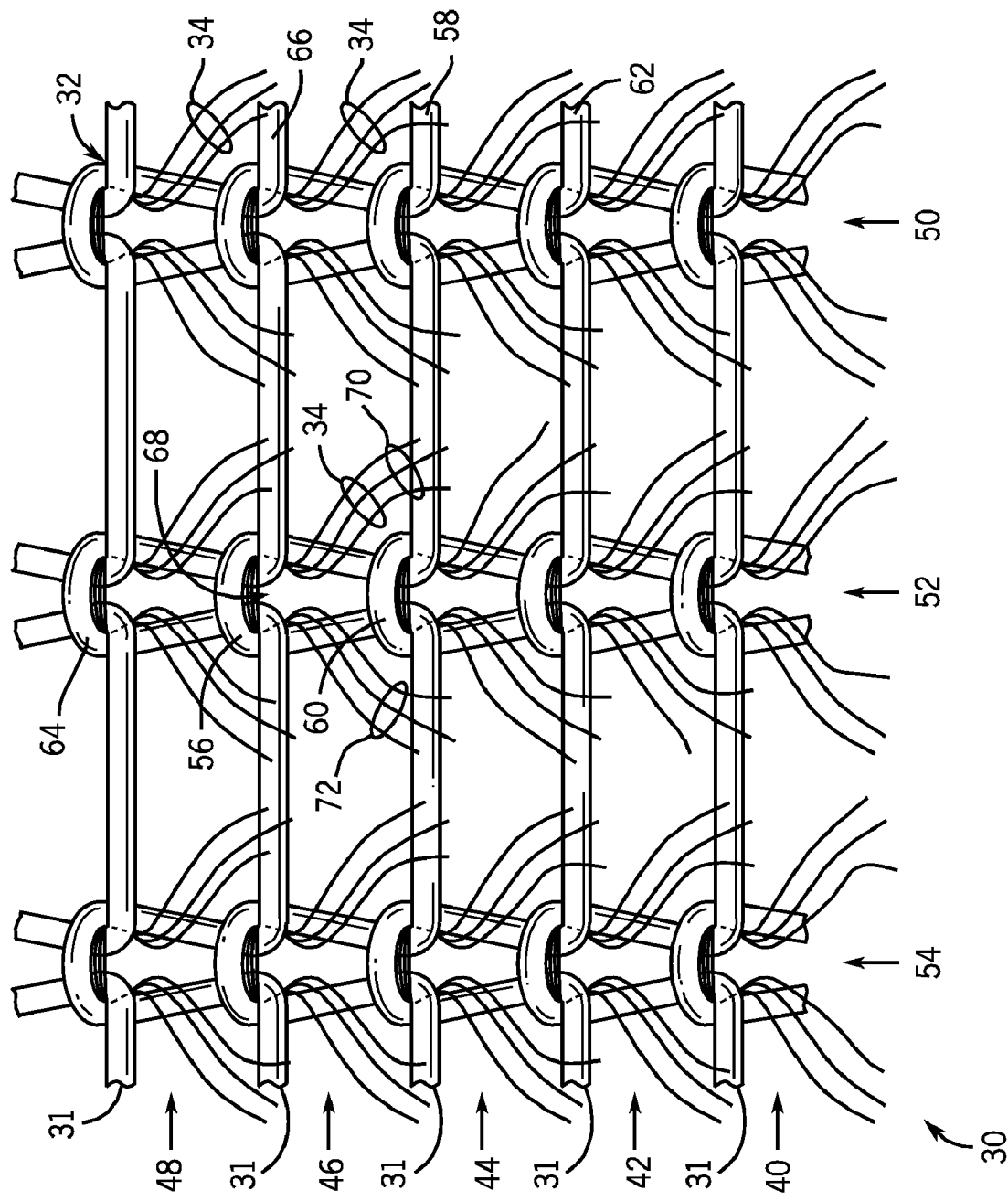
FIG. 3 is a schematic view of a portion of a first embodiment of a tubular paint roller fabric knitted in a pile side-in manner, as illustrated in FIGS. 1 and 2, shown from the inside thereof, showing the knitting pattern of the base yarn and the placement of pile fibers from the sliver into the knit base.

Referring next to FIG. 3, a segment of the pile side-in tubular sliver knit segment 30 is shown in schematic form from the inside thereof to illustrate the knit of the knit base material 32, and the manner in the pile fibers 34 are woven into the knit base material 32. Those skilled in the art will at once realize that while the tufts of the pile fibers 34 shown in FIG. 3 include only a few fibers each for added clarity and understanding of the construction of the pile fabric 30, tufts of the pile fibers 34 in the pile side-in tubular knit segment 30 will actually include sufficient pile fibers 34 to make a pile that is sufficiently dense for the intended use of the tubular sliver knit segment 30 in the manufacture of a paint roller cover.

The foundation of the pile side-in tubular sliver knit segment 30 is the knit base material 32, which is formed from a plurality of threads or yarn segments, indicated generally at 31 in FIG. 3. The knit base material 32 may be knit from a low melt yarn in a single jersey circular knitting process on a circular knitting machine. The knit base material 32 has a plurality of courses (which are rows of loops of stitches which run across the knit fabric), five of which are shown and designated by the reference numerals 40, 42, 44, 46, and 48, and a plurality of wales (which are vertical chains of loops in the longitudinal direction of the knit fabric), three of which are shown and designated by the reference numerals 50, 52, and 54. The respective courses 40, 42, 44, 46, and 48 are knitted sequentially from the lowest course number to the highest course number.

It will be appreciated that if the knit base material 32 is designed to include a low melt component, the threads or yarn segments 31 of the knit base material 32 may each be made of a low melt yarn, or alternatively, only a portion of the threads 31 of the knit base material 32, such as alternating threads 31, can be made of a low melt yarn, depending on the desired end use application of the pile side-in tubular knit fabric 30.

By way of example, the construction of the portion of the pile side-in tubular sliver knit segment 30 in the area of the course 46 and the wale 52 will be discussed herein. A loop 56 formed in a yarn segment, indicated at 58, is located in this area, with a loop 60 formed in a yarn segment indicated at 62 being located in the course 44 below the loop 56, and a loop 64 formed in a yarn segment indicated at 66 being located in the course 48 above the loop 56. The loop 56 extends through the loop 60 from the outside to the inside of the tubular sliver knit segment 30 (shown in FIG. 3), and the loop 64 also extends through the loop 56 from the outside to the inside.

A tuft of pile fibers 34 having a loop portion 68 and opposite end portions 70 and 72 is knitted into the knit base material 32 together with the loop 56. The loop portion 68 of that particular tuft of pile fibers 34 is located adjacent the top of the loop 56, and the opposite end portions 70 and 72 of that particular tuft of pile fibers 34 extend outwardly from the interior of the loop 56, above the loop 60 and below the loop 64. In a similar manner, each of the other tufts of the pile fibers 34 is knitted into the knit base material 32 with a different loop.

Whether or not the knit base material 32 comprises a low melt material, the tufts of the pile fibers 34 of the tubular sliver knit segment 30 can be made of a low melt yarn so that the loop portions thereof may be melted together, as described in more detail below. In order to provide the pile side-in tubular sliver knit segment 30 with a consistent and uniform pile surface (for use as a paint roller cover), the tufts of pile fibers 34 including the low melt yarn component can be knitted into the knit base material 32 in any number of patterns or configurations. For example, every other tuft of pile fibers may be constructed of a low melt yarn, so that a repeating pattern of low melt fibers and high melt fibers/yarns are incorporated into the pile 34. The number of tufts of low melt pile fibers can be determined by a number of factors, including but not limited to, the paint roller fabric application, the type of low melt and high melt fibers used in both the knit base material 32 and the pile 34, and as a matter of design choice.

Figure 4:
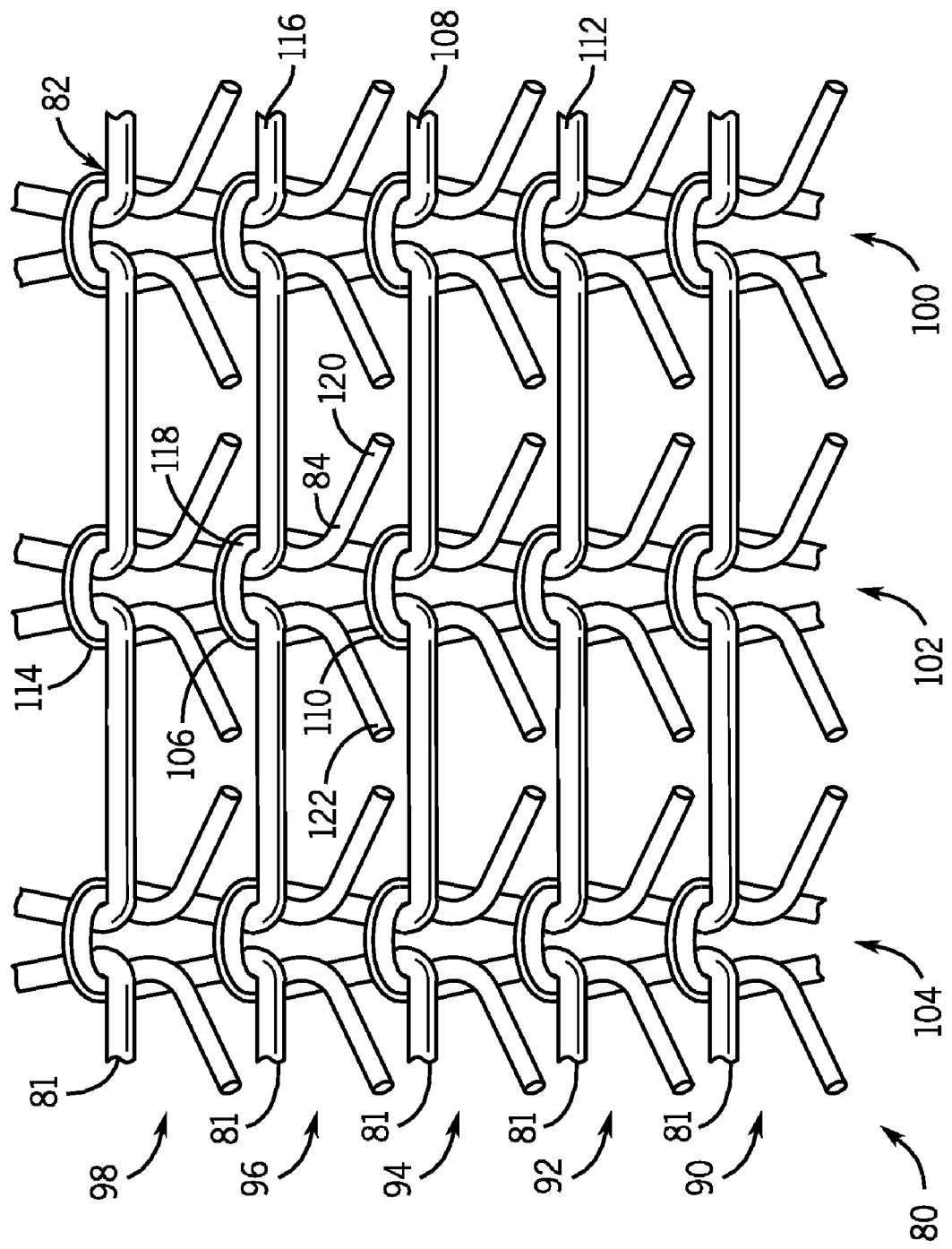
FIG. 4 is a schematic view of a portion of a second embodiment of a tubular paint roller fabric knitted in a pile side-in manner, as illustrated in FIGS. 1 and 2, shown from the inside thereof, showing the knitting pattern of the base yarn and the placement of cut pile yarn segments into the knit base.

Referring now to FIG. 4, a segment of tubular cut pile knit segment 80 that may be continuously knitted in an extended length is schematically shown. The tubular cut pile knit segment 80 consists of a knit backing or base material 82 having cut pile yarn segments 84 extending from the knit base material 82 on the inner surface of the tubular cut pile knit segment 80. The knit base material 82 can be made, at least in part, from a low melt yarn that will be discussed below. In certain embodiments of the present invention, the cut pile yarn segments 84 can also be made, at least in part, from a low melt yarn. It will be appreciated that the tubular cut pile knit segment 80 is manufactured in a pile side-in configuration, in a tubular form similar to the pile side-in tubular segment 30 shown in FIGS. 1 and 2.

The foundation of the tubular cut pile knit segment 80 is the knit base material 82, which is formed from a plurality of threads or yarn segments, indicated generally at 81 in FIG. 4. The knit base material 82 may be knit from a low melt yarn in a single jersey circular knitting process on a circular knitting machine, as described above. The knit base material 82 has a plurality of courses (which are rows of loops of stitches which run across the knit fabric), five of which are shown and designated by the reference numerals 90, 92, 94, 96, and 98, and a plurality of wales (which are vertical chains of loops in the longitudinal direction of the knit fabric), three of which are shown and designated by the reference numerals 100, 102, and 104. The respective courses 90, 92, 94, 96, and 98 are knitted sequentially from the lowest course number to the highest course number.

It will be appreciated that if the knit base material 82 is designed to include a low melt component, the threads or yarn segments 81 of the knit base material 82 may each be made of a low melt yarn, or alternatively, a portion, such as alternating threads 81, can be made of a low melt yarn, depending on the desired end use application of the tubular cut pile knit segment 80.

By way of example, the construction of the portion of the tubular cut pile knit segment 80 in the area of the course 96 and the wale 102 will be discussed herein. A backing loop 106 formed in a backing yarn segment indicated at 108 is located in this area, with a backing loop 110 formed in a backing yarn segment indicated at 112 being located in the course 94 below the backing loop 106, and a backing loop 114 formed in a backing yarn segment indicated at 116 being located in the course 98 above the backing loop 106. The backing loop 106 extends through the backing loop 110 from the outside to the inside of the tubular cut pile knit segment 80 (shown in FIG. 4), and the backing loop 114 also extends through the backing loop 106 from the outside to the inside. It will at once be appreciated by those skilled in the art that this arrangement of backing loops in sequentially knitted courses is completely opposite to the way in which knit fabrics have been knitted on known circular knitting machines.

A cut pile yarn segment 84 having a pile loop portion 118 and opposite pile ends 120 and 122 is knitted into the knit base material 82 together with the backing loop 106. The pile loop portion 118 of that particular cut pile yarn segment 84 is located adjacent the top of the backing loop 106, and the opposite pile ends 120 and 122 of that particular cut pile yarn segment 84 extend outwardly from the interior of the backing loop 106, above the backing loop 110 and below the backing loop 114. In a similar manner, each of the other cut pile yarn segments 84 is knitted into the knit base material 82 with a different backing loop.

Whether or not the knit base material 82 comprises a low melt material, the cut pile yarn segments 84 of the pile side-in tubular cut pile knit segment 80 can be made from a low melt yarn so that the pile loop portions thereof may be melted together with the backing material, as described in more detail below. In order to provide the tubular cut pile knit segment 80 with a consistent and uniform pile surface (for use as a paint roller cover), the cut pile yarn segments 84 including the low melt yarn component can be knitted into the knit base material 82 in any number of patterns or configurations. For example, alternating the cut pile yarn segments knitted into the knit base material 82 may be constructed of a low melt yarn, so that a substantially repeating pattern of low melt cut yarns and high melt yarns are incorporated into the pile 84. The number of low melt cut pile yarn segments 84 incorporated into the knit base material 84 can be determined by a number of factors, including but not limited to, the paint roller fabric application, the type of low melt and high melt fibers used in both the knit base material 82 and the pile 84, and as a matter of design choice.

Figure 5:
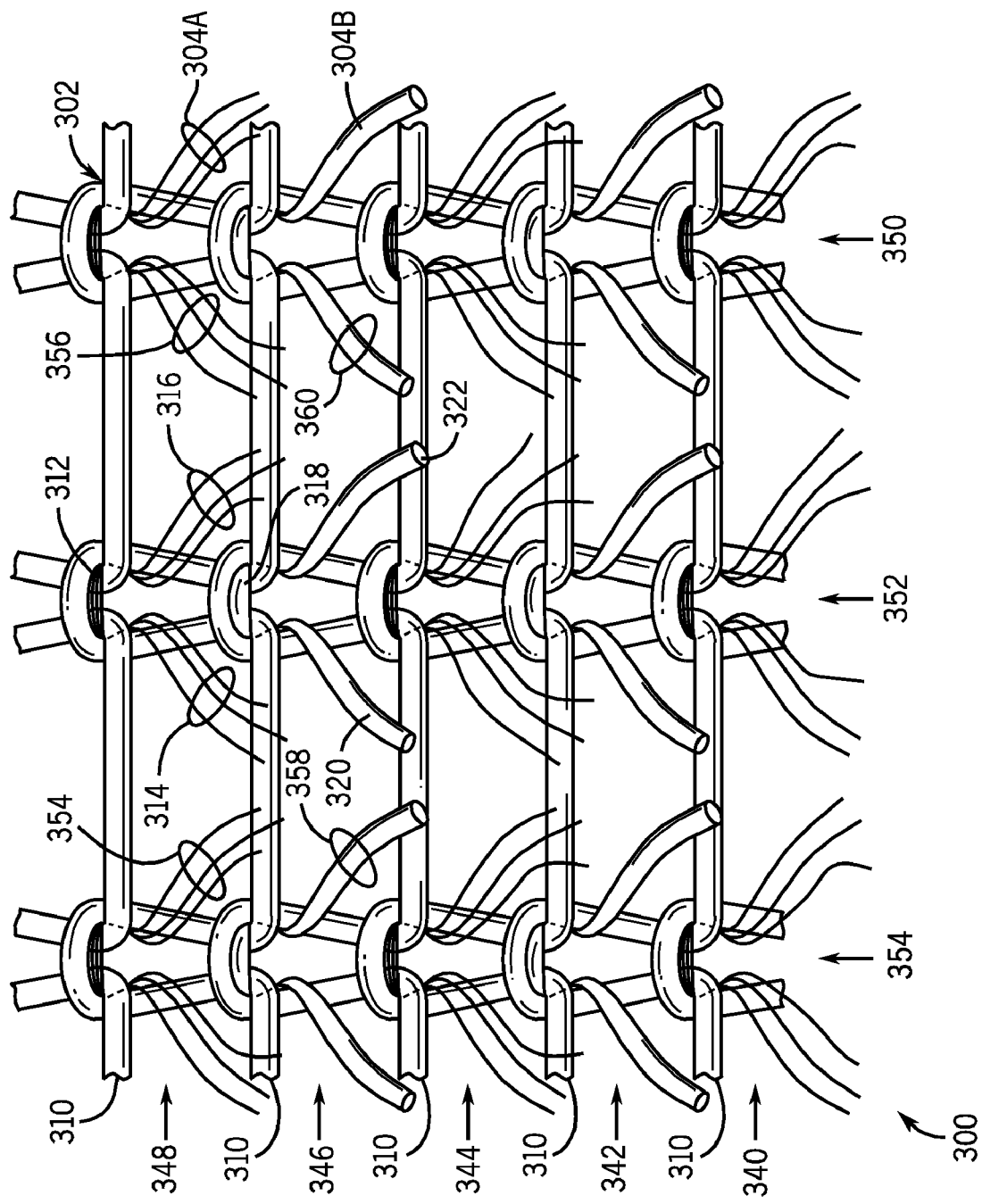
FIG. 5 is a schematic view of a portion of a third embodiment of a tubular paint roller fabric knitted in a pile side-in manner, as illustrated in FIGS. 1 and 2, shown from the inside thereof, showing the knitting pattern of the base yarn and the placement of tufts of sliver fibers and cut pile yarn segments into the knit base.

Turning now to FIG. 5, a segment of pile side-in tubular knit segment 300 comprising a combination of tufts of pile fibers 304A and cut pile yarn segments 304B that may be continuously knitted in an extended length is schematically shown. The tubular knit segment 300 consists of a knit backing or base material 302 having pile fibers 304A and 304B, extending from the knit base material 302 on the inner surface of the tubular knit segment 300. The knit base material 302 and the pile fibers 304A and 304B are constructed at least in part from a low melt yarn that will be discussed below. It will be appreciated that the tubular knit segment 300 is manufactured in a pile side-in configuration, in a tubular form similar to the pile side-in tubular segment 30 shown in FIGS. 1 and 2.

Those skilled in the art will at once realize that while the pile fibers 304A and 304B shown in FIG. 5 include only a few fibers each for added clarity and understanding of the construction of the pile fabric 300, the pile fibers 304A and 304B in the tubular knit segment 300 will actually include sufficient pile fibers 304A and 304B to make a pile that is sufficiently dense for the intended use of the tubular knit segment 300 in the manufacture of a paint roller cover.

The foundation of the tubular knit segment 300 is the knit base material 302, which is formed from a plurality of threads or yarn segments, as indicated generally at 310. The knit base material 302 may be knit from a low melt yarn in a single jersey circular knitting process on a circular knitting machine, as described in more detail above. The knit base material 302 has a plurality of courses (which are rows of loops of stitches which run across the knit fabric), five of which are shown and designated by the reference numerals 340, 342, 344, 346, and 348, and a plurality of wales (which are vertical chains of loops in the longitudinal direction of the knit fabric), three of which are shown and designated by the reference numerals 350, 352, and 354. The respective courses 340, 342, 344, 346, and 348 are knitted sequentially from the lowest course number to the highest course number.

If it is desired to include a low melt component in the knit base material 302, it will be appreciated that all of the threads 310 of the knit base material 302 may be made of a low melt yarn, or alternatively, a portion of knit base material 302, such as alternating threads 310, can be made of a low melt yarn, depending on the desired end use application of the tubular knit fabric 300.

As will be appreciated by those skilled in the art, the construction of the portion of the tubular knit segment 300 is similar to that described with respect to the tubular sliver knit fabric 30 and the tubular cut pile knit segment 80. However, the tubular knit segment 300 includes alternating rows of tufts of pile fibers 304A and cut pile yarn segments 304B knitted into the knit base material 302. Each of the tufts of pile fibers 304A have a loop portion 312 and opposite end portions 314 and 316, and each of the cut pile yarn segments 304B have a pile loop portion 318 and opposite pile ends 320 and 322.

Whether or not the knit base material 302 comprises a low melt material, the tufts of the pile fibers 304A and/or the cut pile yarn segments 304B of the tubular sliver knit segment 300 can be made from a low melt yarn so that the loop portions thereof may be melted together with the backing material, as described in more detail below. In order to provide the tubular knit segment 300 with a consistent and uniform pile surface (for use as a paint roller cover), the pile fibers 304A and 304B including the low melt yarn component can be knitted into the knit base material 302 in any number of patterns or configurations. For example, each of the rows of cut pile yarn segments 304B may be constructed of a low melt yarn, while the rows of tufts of pile fibers 304A are constructed of a high melt, or higher melt material, so that a repeating pattern of low melt fibers and high melt fibers/yarns are incorporated into the pile 304 (including 304A and 304B). Alternatively, tufts of pile fibers, such as tufts 354 and 356 can be constructed of low melt yarn and/or cut yarn segments 358 and 360 can be constructed of low melt yarn. The number of low melt pile fibers can be determined by a number of factors, including but not limited to, the paint roller fabric application, the type of low melt and high melt fibers used in the knit base material 302 and/or the pile 304A and 304B, and as a matter of design choice.

Figure 6:
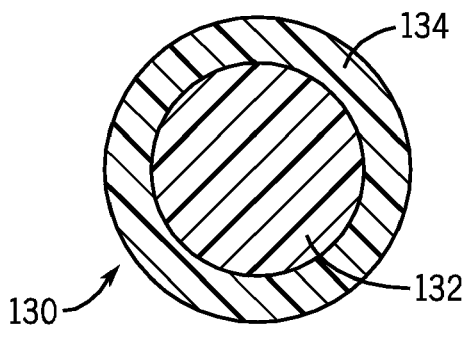

Referring now to FIGS. 6 through 11, a number of different bicomponent fibers are shown by way of example (although numerous alternatives may be manufactured by yarn producers), any of which could be used for the threads of the knit base material and/or pile fibers of the tubular knit fabrics 30, 80 and 300 of the present invention. Referring first to FIG. 6, a sheath-core bicomponent fiber 130 is illustrated which has a high melt component 132 located in the center of the sheath-core bicomponent fiber 130 and a low melt component 134 located on the outer portion of the sheath-core bicomponent fiber 130 which low melt component 134 surrounds the high melt component 132. The segments of the low melt component 134 and the high melt component 132 are concentric.

Consistent with the broader aspects of the present invention, a low melt yarn can be provided wherein the low melt component is provided in the center of a sheath-core bicomponent fiber with a non-melt or high melt component surrounding the low melt component (a construction opposite to that shown in FIG. 6). Indeed, any of the described yarn constructions recited with respect to FIGS. 6 through 11 can be constructed in a manner in which the low melt component 134 is exchanged in position within the bicomponent fiber. As will be appreciated, the application of heat, as described in more detail below, will permit the low melt component 132 to melt or otherwise soften or flow together. As such, such oppositely formed bicomponent fibers can be used with good effect in the methods of the present invention.

The particular low melt components 134 and high melt components 132 used in the tubular knitted fabric of the present invention can be any material known to those skilled in the art, provided that the low melt component melts at temperature sufficiently below the melting point of the high melt component so as not to damage the high melt component 132 during the manufacturing process. Such low melt components/yarns can include, but are not limited to, low-melting thermoplastic polymer or copolymer, such as polypropylene, polyethylene, low melt polyester, low melt co-polyamide (nylon) and the like having a known and/or predetermined melting point. The high melt component 134 is selected so as to remain unaffected at the low melting point of the low melt component and can be constructed of any natural fiber, thermoplastic polymer/copolymer or a composite thereof.

Consistent with the broader aspects of the present invention, the term "low melt yarn" can encompass yarns comprising at least one low melt filament or strand, as described above, and also including a plurality of additional high melt or non-low melt filaments or strands that are combined together by methods well known to those skilled in the art. The additional high melt/non-low melt filaments or strands may be comprised of any suitable natural or synthetic fiber suitable for combination with the low melt fiber or strand. Suitable materials include but are not limited to nylon, rayon, polypropylene, polyester, polyester-cotton blends, cotton, wool and acrylic. Other materials may be used so long as they are compatible with the selected low melt yarn and the final application of the tubular knitted pile fabric segment. In this way, the present invention is not limited to low melt yarns having only two components and includes low melt yarns having multiple strand components.

It will be appreciated that the ratio of low melt component to high melt component used in a particular low melt yarn encompassed by the present invention, will vary depending on the particular end use application of the tubular knitted pile fabric segment. Where a more rigid integral core is to be formed, a low melt yarn having a low melt fiber or strand composition that is substantially equal to or greater than the high melt component composition can be used. For applications where the integral core of the tubular knitted pile fabric segment may be further reinforced, a low melt fiber or strand composition that is less than the high melt component composition can be used.

As will further be appreciated, the low melt component 134 can be selected to have a predetermined shrinkage rate and/or known contraction properties when heated or melted. In particular, the low melt component, specifically a thermoplastic component as described above, will have a known/predetermined percent (%) shrinkage rate or value, as will be well known to those skilled in the art. For a specific bicomponent or low melt yarn, such a value or rate will depend on the type of low melt fiber selected, the number of thermoplastic fibers used in a given yarn, any pretreatment of the yarn prior to knitting the tubular fabric segment and can be a matter of design choice. Such a percent shrinkage value can range from approximately 1% to over about 30%, depending on the low melt yarn design.

The linear mass density of the backing yarn, the pile fibers and/or cut yarn segments used by the present invention may vary between approximately 150 denier and approximately 1500 denier, with a preferred linear mass density being between approximately 560 denier and approximately 1200 denier. It will be understood, however, that the linear mass density of each fiber or strand of the bicomponent or multi-component low melt yarn will be determined by the specific fiber/strand selected, and is a matter of design choice, depending at least in part on the knitting equipment utilized and the end use application of the tubular knitted pile fabric segment.

Figure 7:
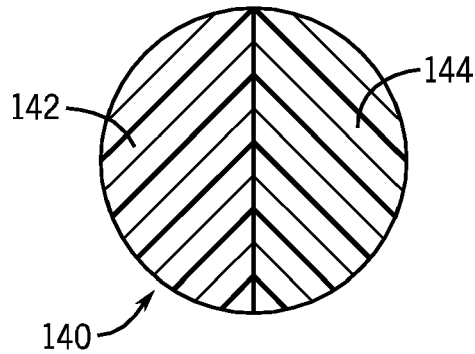
FIG. 7 is a cross sectional view of a side-by-side bicomponent fiber showing opposite sides that are respectively made of materials having different melting points.
Figure 8:
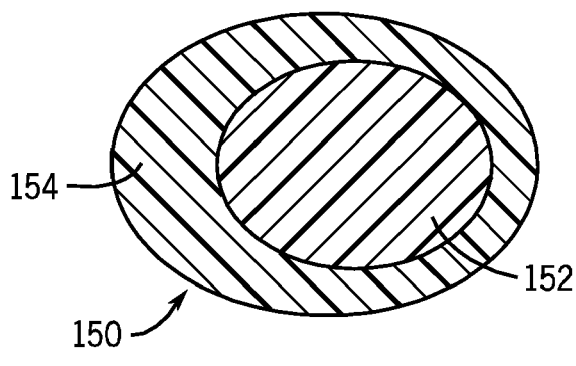
FIG. 8 is a cross sectional view of an eccentric sheath-core bicomponent fiber having a core made of a material that has a higher melting point than the material that its sheath.

Referring next to FIG. 7, a side-by-side bicomponent fiber 140 is illustrated which has one side (a semicircular cross section) made of a high melt component 142 and the other side (a complementary semicircular cross section) made of a low melt component 144. Referring now to FIG. 8, an eccentric sheath-core bicomponent fiber 150 is illustrated which has a high melt component 152 located in the center of the eccentric sheath-core bicomponent fiber 150 and a low melt component 154 located on the outer portion of the eccentric sheath-core bicomponent fiber 150 which low melt component 154 surrounds the high melt material 152. By definition in an eccentric sheath-core relationship, the segments of the low melt component 154 and the high melt component 152 are not concentric.

Figure 9:
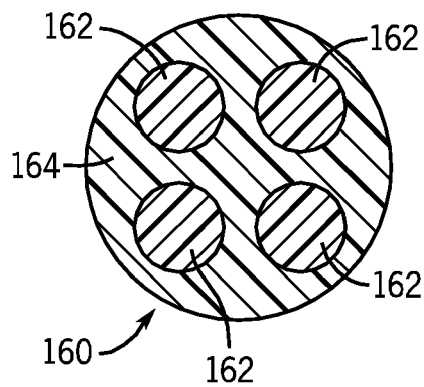
FIG. 9 is a cross sectional view of a matrix-fibril bicomponent fiber having a plurality of segments made of a material that has a higher melting point located within a sheath that is made of a lower melting point material.

Referring next to FIG. 9, a matrix-fibril bicomponent fiber 160 is illustrated which has four segments of high melt component 162 distributed in a matrix of low melt component 164 that entirely surrounds the segments of high melt component 162. Although four segments of high melt component 162 are shown in FIG. 9, more or fewer could be used. Also, although the four segments of high melt component 162 are shown as being evenly distributed in the surrounding low melt component 164, the segments of high melt component 162 could be distributed more randomly in the surrounding low melt component 164 as well.

Figure 10:
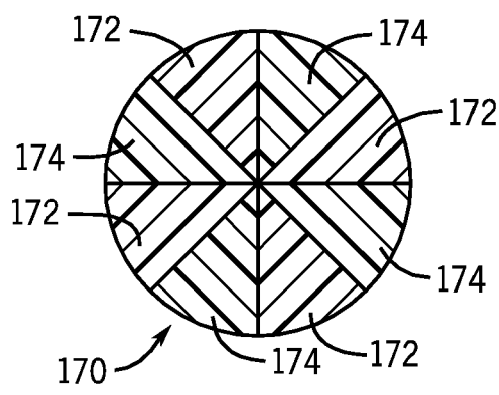
FIG. 10 is a cross sectional view of a segmented pie bicomponent fiber having alternating wedges made of materials having different melting points.

Referring now to FIG. 10, a segmented pie bicomponent fiber 170 is illustrated which has eight pie-shaped segments that are evenly distributed around the circumference of the segmented pie bicomponent fiber 170. The segments alternate between high components 172 and low melt components 174. Although four segments of high melt component 172 and four segments of low melt component 174 are shown in FIG. 10, more or fewer could be used.

Figure 11:
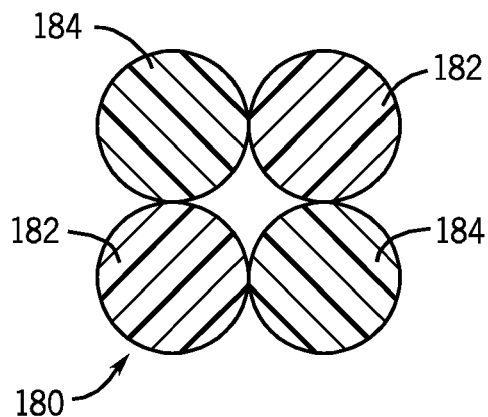
FIG. 11 is a cross sectional view of a bicomponent yarn showing two different types of fibers, one of which fiber types has a lower melting point than the other fiber type.

Referring next to FIG. 11, a bicomponent yarn 180 is illustrated which is made up of four fibers, two of which are high melt fibers 182 and two of which are low melt fibers 184. As is the case with any yarn, the high melt fibers 182 and the low melt fibers 184 are twisted together to form the segment of bicomponent yarn 180. Although two high melt fibers 182 and two low melt fibers 184 are shown in FIG. 11, more or fewer of each could be used.

Referring now to FIGS. 12 and 13, a mandrel heating assembly 190 is illustrated in two cross sectional views. The mandrel heating assembly 190 of the exemplary embodiment has a mandrel 192 that is cylindrical and has an outer diameter of approximately one and three-eighths inches (35 millimeters) or slightly less and has a coaxial cylindrical aperture 194 located therein that is approximately three-quarters of an inch (19 millimeters) in diameter or slightly larger extending therethrough, which mandrel 192 may be made out of steel. A smaller aperture 196 that is approximately one-eighth of an inch (3.2 millimeters) in diameter or slightly larger extends longitudinally through the mandrel 192 and is located in the mandrel 192 between the aperture 194 and the outer surface of the mandrel 192.

A cartridge heater 198 is located in the aperture 194 in the mandrel 192. The cartridge heater 198 may be a Watlow FIREROD Part No. N24A23-E12H cartridge heater from Watlow Electric Manufacturing Company of St. Louis, Mo. The cartridge heater 198 has a three-quarter inch (19 millimeter) diameter and is twenty-four inches (610 millimeters) long, has a 2750 Watt rating, and has two heater leads 200 extending from one end thereof.

A thermocouple 202 is located in the aperture 196 in the mandrel 192. The thermocouple 202 may be an Omega Model No. JMQSS-125G-6 thermocouple from Omega Engineering, Inc. of Stamford, Conn. The thermocouple 202 has a has an one-eighth inch (3.2 millimeter) diameter, is twenty-four inches (610 millimeters) long, and has two thermocouple leads 204 extending from one end thereof.

Referring next to FIG. 14, a control circuit for operating the cartridge heater 198 based on temperature information received from the thermocouple 202 is illustrated. A Eurotherm Model No. 2216e general purpose PID (Proportional-Integral-Derivative) temperature controller from Eurotherm Inc. of Leesburg, Va. has as an input the thermocouple leads 204 from the thermocouple 202, and is connected through the heater leads 200 to operate the cartridge heater 198 at the desired temperature.

Figure 15:
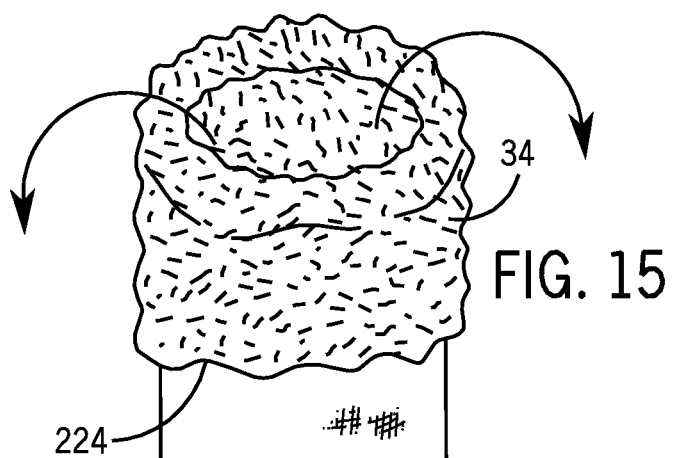
FIG. 15 is an isometric view of the segment of tubular paint roller fabric illustrated in FIGS. 1 through 5, showing the pile side-in fabric segment being inverted from a pile side-in configuration to a pile side-out configuration.

Turning now to FIG. 15, a tubular knitted pile fabric 220 (which may be the tubular sliver knit segment 30, the tubular cut pile knit segment 80 or the tubular knit pile fabric 300 having a combination of sliver fiber and cut yarn pile) has a first end 222 and a second end 224 and is shown as it being inverted. The pile side-in segment (30, 80 or 300) is inverted to a pile side-out configuration so that the pile 34 is on the outside surface thereof, and the knit base 32 is on the inside surface thereof. The tubular knitted pile fabric 220 can be inverted by any means known to those skilled in the art, including, but not limited to manually, or using a an automated transfer tube process.

Figure 16:
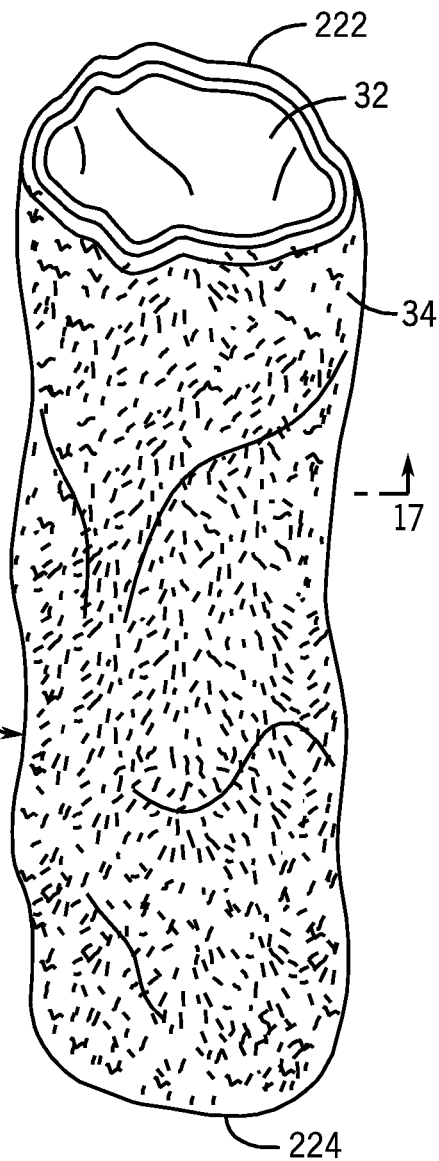
FIG. 16 is an isometric view of the segment of tubular paint roller fabric illustrated in FIG. 15, showing the inverted tubular paint roller fabric segment in a pile side-out configuration.
Figure 17:
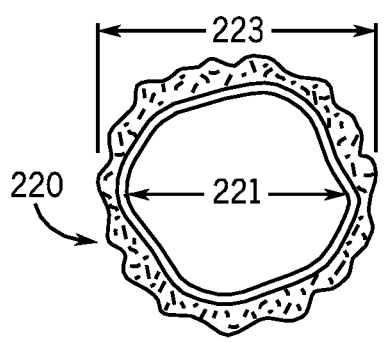
FIG. 17 is cross sectional view of the segment of the inverted tubular paint roller fabric segment illustrated in FIG. 16, taken along the line 17-17 therein, showing the distorted and stretched segment having inconsistent/non-uniform inner and outer diameters.

As best illustrated in FIGS. 16 and 17, the inverted tubular knitted pile fabric 220 may become stretched or otherwise wrinkled during the inversion process. In particular, the tubular knitted pile fabric 220 can have an irregular inner diameter 221 and outer diameter 223 along its entire length 225 after the segment is inverted from a pile side-in to a pile side-out configuration. It will also be understood that the inverted tubular knitted pile fabric 220 may also be deformed as to its length 225, depending on the type of inversion process used. In particular, the length 225 of the inverted tubular knitted pile fabric 220 may be longer than that desired.

Figure 18:
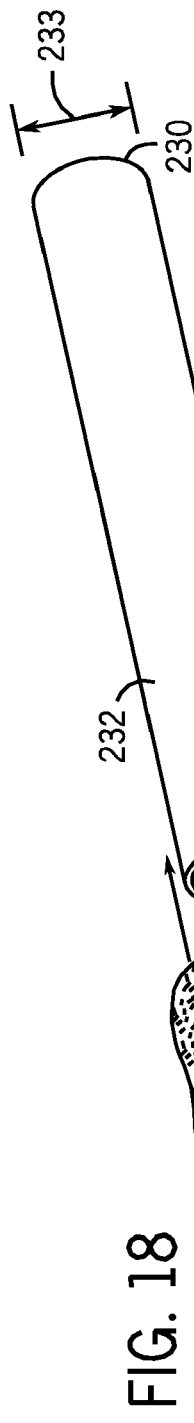
FIG. 18 is a schematic isometric depiction showing an end of an inverted tubular knitted pile fabric about to be slid onto an outer non-stick surface of a hollow cylindrical aluminum heating tube.

Referring next to FIG. 18, the inverted, pile side-out tubular knitted pile fabric 220 is shown as it is about to be pulled onto the exterior surface of a hollow cylindrical aluminum heating tube 226 having a first end 228 and a second end 230 and a nonstick substance 232 on the outer surface thereof. The aluminum heating tube 226 has an outer diameter 233 that is approximately the same as the inner diameter of a finished paint roller cover core (paint roller cover cores typically have an inner diameter of approximately one and one-half inches (38 millimeters), although alternative sizes such as inner diameters of one and three-quarters inches (44 millimeters) and two inches (51 millimeters) can be manufactured as well).

The aluminum heating tube 226 has an inner diameter of approximately one and three-eighths inches (35 millimeters) or slightly greater and is sized to fit removably over the mandrel 192 of the mandrel heating assembly 190 (shown in FIGS. 12 and 13). (It should be noted that the inner diameter of the aluminum heating tube 226 is not critical, and indeed will vary according to the outer diameter of the mandrel 192 of the mandrel heating assembly 190.) The outer surface of the aluminum heating tube 226 is coated with a low coefficient of friction material such as silicone or polytetrafluoroethylene (PTFE, such as the material marketed by DuPont under the trademark TEFLON) to provide a non-stick substance 232 thereupon.

Figure 19:
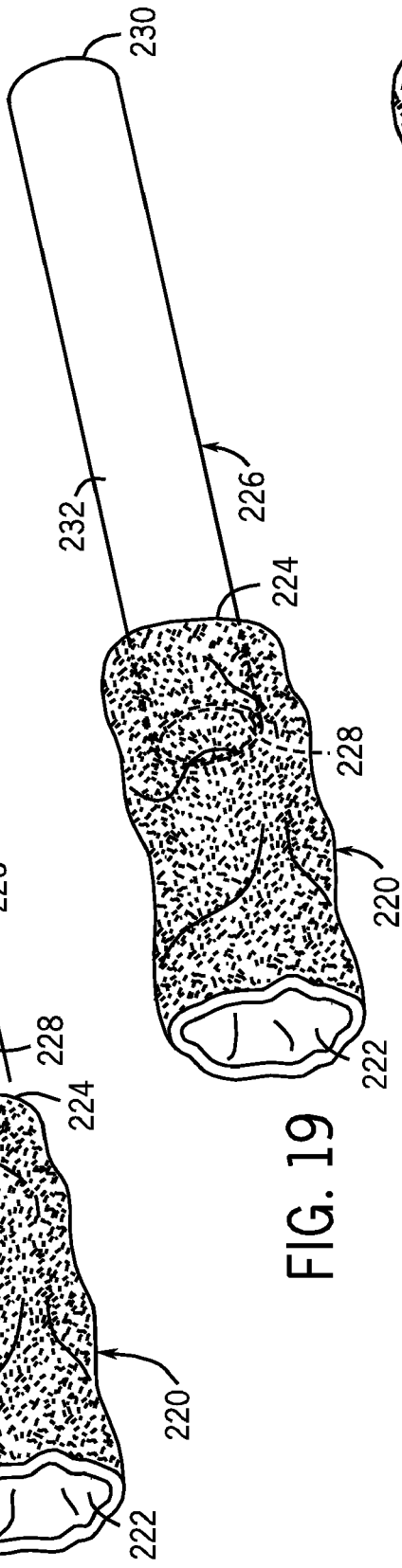
FIG. 19 is a schematic isometric depiction of the tubular knitted pile fabric illustrated in FIG. 18, with the tubular knitted pile fabric being partially slid onto the outer non-stick surface of the aluminum heating tube.
Figure 20:
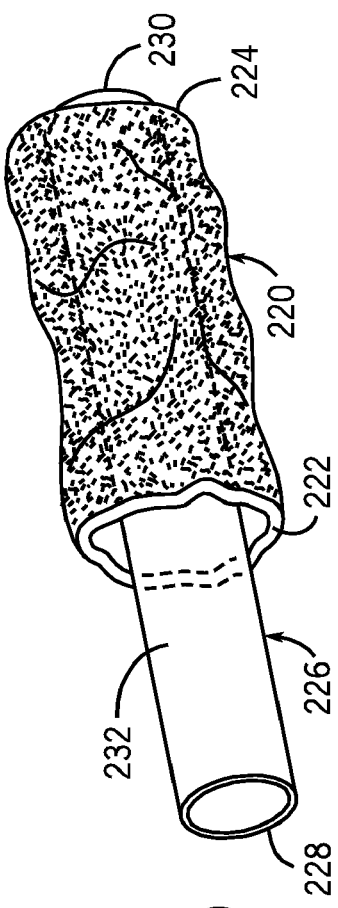
FIG. 20 is a schematic isometric depiction of the tubular knitted pile fabric illustrated in FIGS. 18 and 19, with the tubular knitted pile fabric now located upon the outer non-stick surface of the aluminum heating tube.

As best illustrated in FIGS. 19 and 20, the inner diameter 221 of the pile side-out tubular knitted pile fabric 220 may be larger than the outer diameter of the aluminum heating tube 226, and/or may be generally inconsistent in diametral dimension along its length 225 (as shown in FIGS. 16 and 17).

The tubular knitted pile fabric 220 is of a length that corresponds to the desired length of a paint roller cover, taking into account the shrinkage rate of the low melt yarn used therein. For a nine inch (229 millimeters) long paint roller cover, the tubular knitted pile fabric 220 will have to be sufficiently long such that following the application of heat the resulting paint roller cover will be of the desired length. For example, if the low melt yarn utilized is known to result in an approximately eight percent shrinkage rate, the tubular knitted pile fabric 220 will need to be approximately 9.8 inches (249 millimeters) long.

It will be appreciated by those skilled in the art that the tubular knitted pile fabric 220 could alternately be sized for use in manufacturing a plurality of paint roller covers of any of several different lengths. For example, the tubular knitted pile fabric 220 could be approximately one hundred inches (2.54 meters) long, which is a sufficient length to allow it to be used for the manufacture of seven nine inch (229 millimeter) long paint roller covers. In this case, of course, the aluminum heating tube 226 and the mandrel heating assembly 190 (shown in FIGS. 13 and 14) would have to be proportionately longer as well.

In FIG. 18, the tubular knitted pile fabric 220 is shown with its second end 224 about to be pulled over the first end 228 of the aluminum heating tube 226. FIG. 19 shows the tubular knitted pile fabric 220 partly pulled onto the aluminum heating tube 226, and FIG. 20 shows the tubular knitted pile fabric 220 fully pulled onto the aluminum heating tube 226, with the second end 224 of the tubular knitted pile fabric 220 located close adjacent to the second end 230 of the aluminum heating tube 226. The tubular knitted pile fabric 220 fits easily on the outer diameter of the aluminum heating tube 226, and is not stretched on the aluminum heating tube 226.

Figure 21:
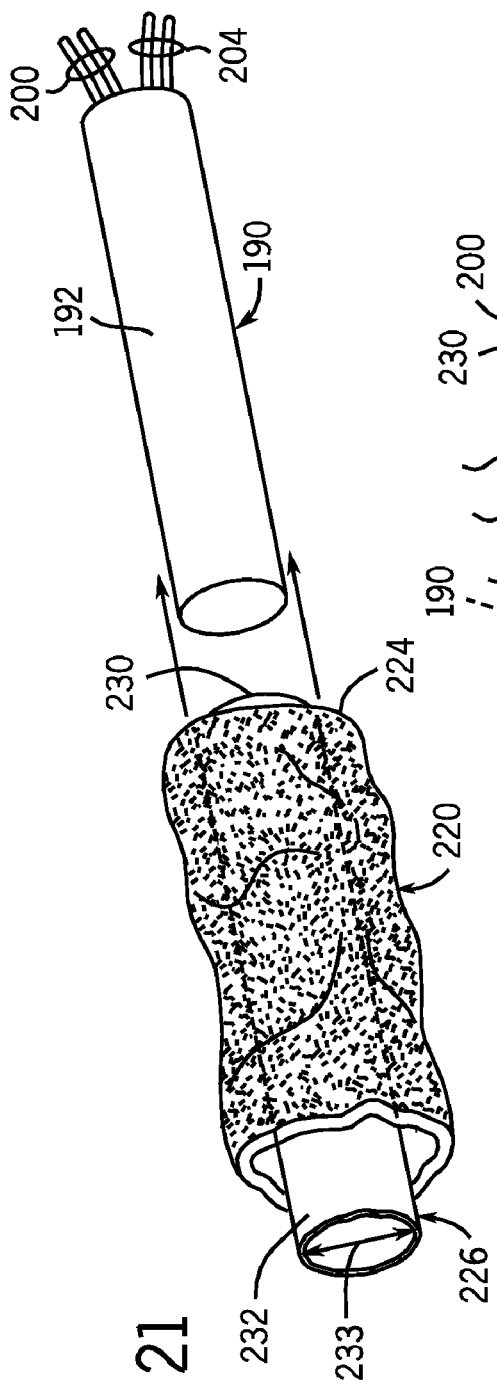
FIG. 21 is a schematic isometric depiction of the tubular knitted pile fabric and the outer non-stick surface of the aluminum heating tube illustrated in FIGS. 18 through 20 about to be slid onto the mandrel heating assembly.

Referring next to FIG. 21, the aluminum heating tube 226 with the tubular knitted pile fabric 220 located thereupon is about to be placed onto the mandrel heating assembly 190. As mentioned above, the inside diameter of the aluminum heating tube 226 is sized to fit removably over the outer diameter of the mandrel 192 of the mandrel heating assembly 190, but with a relatively close fit to allow heat from the mandrel heating assembly 190 to be transferred to and through the aluminum heating tube 226. Prior to placing 226 with the tubular knitted pile fabric 220 located thereupon over the mandrel heating assembly 190, the mandrel heating assembly 190 is brought up to the desired temperature. Typically, this will take less than one minute.

The temperature of the mandrel heating assembly 190 is a function of which particular bicomponent material is used in the low melt yarn used for the backing and pile of the tubular knitted pile fabric 220. More specifically, the temperature used must be at or above the melting point of the low melt component used in the backing and pile materials, but below the melting point of the high melt component used in the backing and pile material of the tubular knitted pile fabric 220. The temperature of the mandrel heating assembly 190 accordingly varies according to the properties of the bicomponent material, and will typically be set between approximately 250 degrees Fahrenheit (121 degrees Celsius) and approximately 450 degrees Fahrenheit (232 degrees Celsius), although with some bicomponent materials the temperature may vary from as low as approximately 250 degrees Fahrenheit (121 degrees Celsius) to as high as 600 degrees Fahrenheit (316 degrees Celsius).

Figure 22:
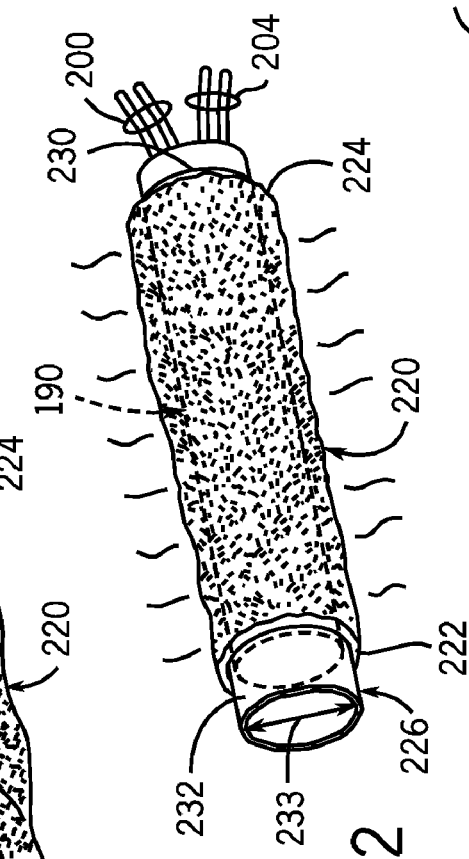
FIG. 22 is a schematic isometric depiction of the tubular knitted pile fabric and the outer non-stick surface of the aluminum heating tube illustrated in FIGS. 18 through 21 located upon the mandrel heating assembly illustrated in FIG. 17 and being heated.

In FIG. 21, the aluminum heating tube 226 with the tubular knitted pile fabric 220 located thereupon is shown with the second end 230 of the aluminum heating tube 226 about to be pulled over the mandrel heating assembly 190. FIG. 22 shows the aluminum heating tube 226 with the tubular knitted pile fabric 220 located thereupon fully pulled onto the mandrel heating assembly 190, where it is heated and maintained for a period of time sufficient to activate the backing yarn and knit/looped ends of the low melt pile fibers. (Activating the backing yarn and looped/knit ends of the pile fibers constitutes melting the low melt component of the bicomponent material of the backing and pile yarn of the tubular knitted pile fabric 220 so that it will flow together to lock the backing yarn and knit looped portions of the pile fibers into an integral cylindrical core 246 around the aluminum heating tube 226.)

This period of time can vary between approximately five seconds to approximately ninety seconds, with typical times for most bicomponent materials varying from approximately five seconds to approximately sixty seconds.

Figure 23:
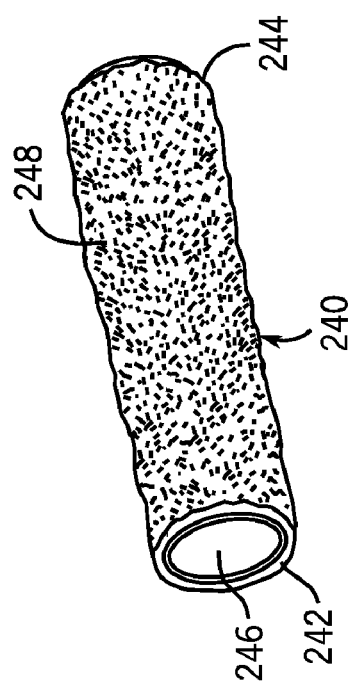
FIG. 23 is a schematic isometric depiction of the tubular knitted pile fabric that was heated on the aluminum heating tube and the mandrel heating assembly illustrated in FIGS. 21 and 22 with the backing fused into a rigid cylindrical configuration.

As best illustrated in FIGS. 22 and 23, during this activation process, the low melt component 132 of each of the backing yarn and looped/knit ends of the pile fibers will shrink according to the shrink rate/thermoplastic properties of the low melt components utilized therein. In particular, the backing yarn and/or looped end of the pile is designed to shrink a sufficient amount so that the inner diameter 221 of the tubular knitted pile fabric 220 closely conforms to the outer surface 232 of the aluminum heating tube 226, thereby shrinking to the approximate size of the outer diameter 233 of the aluminum heating tube 226, as illustrated in FIG. 23.

Clamps securing the fabric in place (not shown herein) can be utilized to control the fabric's shrinking characteristics. Following the activation process, the aluminum heating tube 226 with the now-activated tubular knitted pile fabric 240 located thereupon is removed from the mandrel heating assembly 190 and allowed to cool, which typically takes only a few seconds. The activated tubular knitted pile fabric 240 may then be removed from the aluminum heating tube 226.

Referring next to FIG. 23, the activated tubular knitted pile fabric 240 is shown as having a first end 242 and a second end 244, with a pile 248 extending outwardly from the activated tubular knitted pile fabric 240. The inside of the activated tubular knitted pile fabric 240 is a cylindrical fused backing, comprising a substantially rigid integral core member 246. Finishing the activated tubular knitted pile fabric 240 will include the steps of combing the pile 248 of the activated tubular knitted pile fabric 240 and shearing it to the desired length. Finally, the ends 242 and 244 of the activated tubular knitted pile fabric 240 may be finished and the edges of the activated tubular knitted pile fabric 240 may be beveled, and any loose fibers may be vacuumed off.

While the exemplary embodiment discussed above produces a nine inch (229 millimeter) paint roller cover, the tubular knitted pile fabric 220, the aluminum heating tube 226, and the mandrel heating assembly 190 (as shown in FIGS. 21 and 22) could alternately be sized for use in manufacturing a plurality of paint roller covers of any of several different lengths. For example, a substantially longer activated tubular knitted pile fabric 240 could be produced and subsequently be cut into unfinished paint roller cover segments of any desired size. These unfinished paint roller cover segments would then be finished as described above.

Figure 24:
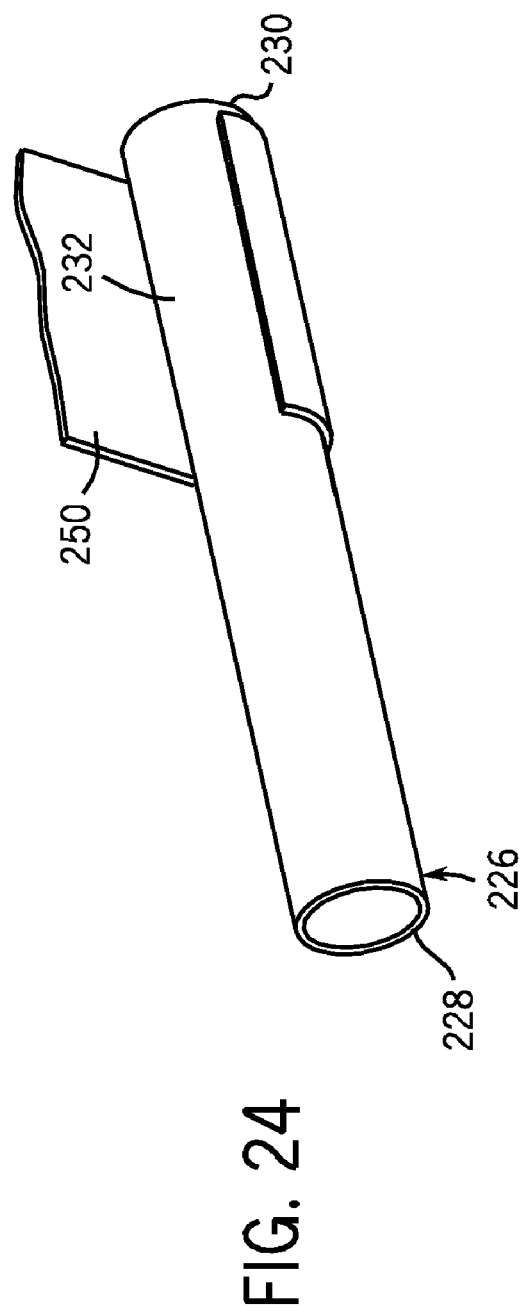
FIG. 24 is a schematic isometric depiction showing a wide segment of dry adhesive film beginning to be wound around the outer non-stick surface of the aluminum heating tube.
Figure 25:
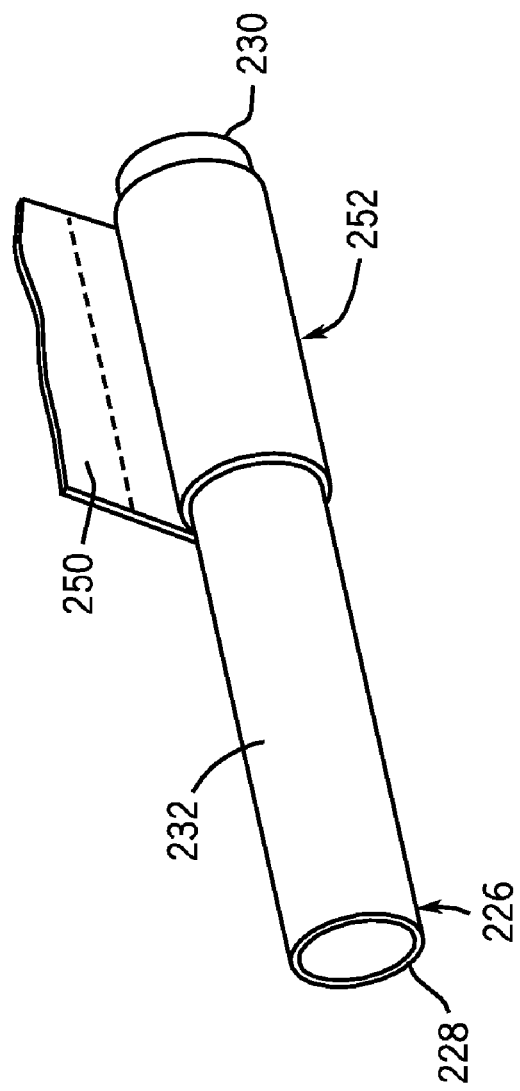
FIG. 25 is a schematic isometric depiction showing one or more windings of dry adhesive film on the aluminum heating tube shown in FIG. 24.

An alternate embodiment of the paint roller cover manufacturing method of the present invention is shown in FIGS. 24 through 28. Referring first to FIG. 24, one or more layers of dry adhesive film 250 is wound around the aluminum heating tube 226. The dry adhesive film 250 generally consists of a thin plastic film that is coated on one side (the side that will be wound facing outwardly) with a non-tacky adhesive, and may optionally have a pressure-sensitive adhesive on the opposite side to facilitate the installation of the dry adhesive film 250 onto the aluminum heating tube 226. One dry adhesive film that may be used, for example, is Stock No. 233 from Lenderink Technologies in Belmont, Mich. The thickness of the dry adhesive film 250 may vary from approximately 0.0005 inches (0.0127 millimeters) thick to approximately 0.01 inches (0.254 millimeters) thick. For example, from one to seven layers of 0.0012 inch (0.0305 millimeter) thick dry adhesive film 250, or from one to three layers of thicker dry adhesive film 250 (0.0024 inch (0.61 millimeter) thick to 0.0072 inch (0.183 millimeter) thick) being used. The dry adhesive film 250 is cut when a sufficient length of the dry adhesive film 250 has been wound around the aluminum heating tube 226 to form a wrapped dry adhesive film 252, as shown in FIG. 25.

Referring next to FIG. 26, the tubular knitted pile fabric 220 is shown with its second end 224 about to be pulled over the first end 228 of the aluminum heating tube 226, and then onto the wrapped dry adhesive film 252 on the aluminum heating tube 226 FIG. 27 shows the tubular knitted pile fabric 220 fully pulled onto the wrapped dry adhesive film 252 on the aluminum heating tube 226, with the aluminum heating tube 226 with the tubular knitted pile fabric 220 and the wrapped dry adhesive film 252 located thereupon about to be placed over the mandrel heating assembly 190.

FIG. 28 shows the aluminum heating tube 226 with the tubular knitted pile fabric 220 and the wrapped dry adhesive film 252 located thereupon fully pulled onto the mandrel heating assembly 190, where it is heated and maintained for a period of time sufficient to activate the wrapped dry adhesive film 252 and the backing yarn/looped ends of the low melt pile fiber, with the wrapped dry adhesive film 252 and the low melt component of the bicomponent material of the backing yarn and looped ends of pile fiber of the tubular knitted pile fabric 220 flowing together and shrinking a sufficient amount to form an integral cylindrical core around the mandrel 192 of the mandrel heating assembly 190. Following the activation process, the aluminum heating tube 226 with the now-fused together material is removed from the mandrel heating assembly 190 and allowed to cool. The resulting assembly may then be removed from the aluminum heating tube 226 and finished as described above.

Figure 29:
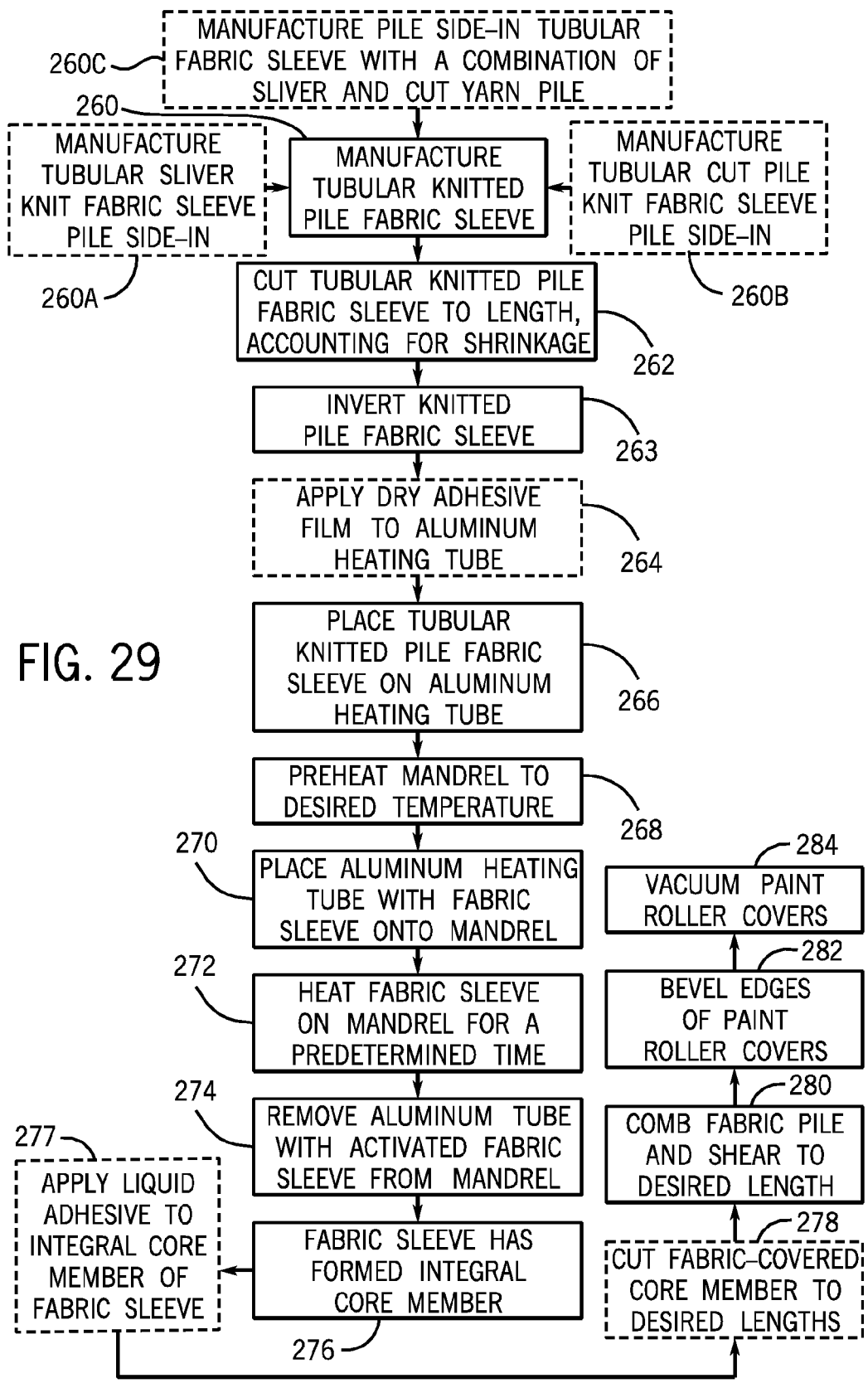
FIG. 29 is a flow diagram showing the manufacturing of a paint roller cover that is made according to the teachings of the present invention, with a number of the steps being those illustrated in FIGS. 1 through 28.

Referring finally to FIG. 29, the paint roller cover manufacturing method of the present invention is shown in a flow chart that includes a number of the variations discussed herein. The paint roller cover manufacturing operation starts in a manufacture tubular knitted pile fabric sleeve step 260 in which the tubular knitted pile fabric used in the tubular knitted pile fabric 220 (shown in FIGS. 16 through 20) is manufactured.

The tubular knitted pile fabric used in the tubular knitted pile fabric 220 (shown in FIGS. 18 through 23) is represented in a manufacture pile side-in tubular sliver knit fabric sleeve 260A, which corresponds to manufacture of the tubular sliver knit segment 30 shown in FIGS. 1 through 3. The tubular knitted pile fabric used in the tubular knitted pile fabric 220 can also be a tubular cut pile knit fabric sleeve 260B, which corresponds to manufacture of the pile side-in tubular cut pile knit segment 80 shown in FIGS. 1, 2 and 4. The tubular knitted pile fabric used in the tubular knitted pile fabric 220 can also be a pile side-in tubular knit fabric sleeve 260C including tufts of pile fibers and cut pile yarn segments, which correspond to manufacture of the tubular knit segment 300 shown in FIGS. 1, 2 and 5.

The process next moves to a cut tubular knitted pile fabric sleeve to length step 262 in which the tubular knitted pile fabric is cut to the desired length of the tubular knitted pile fabric 220. As mentioned above, the tubular knitted pile fabric 220 will have to be sufficiently long such that following the application of heat the resulting paint roller cover will be of the desired length, taking account of the shrinkage rate of the low melt yarn used therein that may occur during the heating process. Alternately, the tubular knitted pile fabric 220 could be sized for use in manufacturing a plurality of paint roller covers of any of several different lengths. For example, a substantially longer activated tubular knitted pile fabric 240 (shown in FIG. 23) could be produced and subsequently be cut into unfinished paint roller cover segments of any desired size.

The process next moves to an inversion step 263, wherein the pile side-in tubular knitted pile fabric sleeve is inverted from a pile side-in configuration to a pile side-out configuration. This inversion operation may be accomplished by any means known to those skilled in the art.

Optionally, an apply dry adhesive film to aluminum heating tube step 264 can then be used if it is desired to apply the wrapped dry adhesive film 252 (shown in FIG. 25) under the tubular knitted pile fabric 220 on the aluminum heating tube 226.

With or without the apply dry adhesive film to aluminum heating tube step 264, the tubular knitted pile fabric 220 is placed onto the aluminum heating tube 226 in a place tubular knitted pile fabric sleeve on aluminum tube step 266, as shown in FIGS. 18 through 20 (without the wrapped dry adhesive film 252) or in FIG. 26 (with the wrapped dry adhesive film 252). The process next moves to a preheat mandrel to desired temperature step 268, wherein the mandrel heating assembly 190 is heated to the desired temperature to activate the low melt component in the backing of the tubular knitted pile fabric 220.

The process then moves to a place aluminum heating tube with fabric sleeve onto mandrel step 270, in which the aluminum heating tube 226 with the tubular knitted pile fabric 220 (and, optionally, the wrapped dry adhesive film 252) located thereupon is placed onto the mandrel heating assembly 190 to initiate the heating process, as shown in FIG. 22. The aluminum heating tube 226 with the tubular knitted pile fabric 220 (and, optionally, the wrapped dry adhesive film 252) located thereupon is heated on the mandrel heating assembly 190 for a predetermined time as shown in FIG. 22 in a heat fabric sleeve on mandrel for a predetermined time step 272.

The process then moves to a remove aluminum tube with activated fabric sleeve from mandrel step 274 in which the aluminum heating tube 226 with the activated tubular knitted pile fabric 240 (shown in FIG. 23) is removed from the mandrel heating assembly 190 and allowed to cool. At this point, the activated tubular knitted pile fabric 240 has cooled and has an integral cylindrical fused core 246 located on the inside thereof, as indicated in a fabric sleeve has formed integral core member step 276.

Optionally, an apply liquid adhesive layer to integrally formed core member of tubular fabric sleeve step 277 can then be used if it is desired to further enhance the rigidity of the integrally formed core member 246 of tubular fabric sleeve 240.

Next, in an optional cut fabric-covered core member to desired lengths step 278, the activated tubular knitted pile fabric 240 may be cut into a plurality of unfinished paint roller covers of any desired size. This step is, of course, not performed if the tubular knitted pile fabric 220 was cut to meet its finished size in the cut tubular knitted pile fabric sleeve to length step 262. The unfinished paint roller covers may then have the fabric pile thereupon combed and sheared to a desired length in a comb and shear fabric pile step 280. It should be noted that the comb and shear fabric pile step 280 may instead be performed before the cut fabric-covered core member to desired lengths step 278.

Next, in a bevel edges of paint roller covers step 282, the edges of the unfinished paint roller covers are beveled to finish them. Finally, in a vacuum paint roller covers step 284, loose fibers are vacuumed off the unfinished paint roller covers, finishing them into paint roller covers which may then be packaged and sold (typically, vacuuming is accomplished throughout the brushing, shearing, and beveling steps rather than as a separate step).

It may therefore be appreciated from the above detailed description of the preferred embodiment of the present invention that it teaches a method by which a paint roller cover may be manufactured from tubular knitted pile fabric knitted in a pile side-in manner. In particular, the pile side-in tubular knit fabric for use in the methods of the present invention can be knitted on conventional tubular knitting machines. Further, in practicing the paint roller cover manufacturing method of the present invention, use of a low melt yarn or fiber in one of the backing material and/or pile in the manufacture of a pile side-in tubular fabric, inverting the fabric and then heating the low melt material to its melting and/or shrinking point ensures that the final paint roller cover is free from wrinkles or other surface defects that can be introduced into the tubular knitted pile fabric during the inverting process.

The paint roller cover manufacturing method of the present invention results in an acceptable pile which extends from an acceptably rigid core which can be installed on and used with any conventional paint roller frame, or on a frame uniquely designed for the paint roller utilizing the new core design. The paint roller cover manufacturing method of the present invention facilitates either the manufacture of a paint roller cover of a desired finished length, or the manufacture of an extended length segment from which segments of any desired size can be cut for finishing as paint roller covers, thereby facilitating the mass manufacture of paint roller covers. The paint roller cover manufacturing method of the present invention can use tubular knitted pile fabric including sliver fibers, cut yarn pile or a combination of each, as well as utilize a number of different backing materials.

The paint roller cover manufacturing method of the present invention results in a construction which is both durable and long lasting, and yields a paint roller cover of superior quality. The paint roller cover manufacturing method of the present invention also reduces the cost of manufacturing paint roller covers when compared to conventional methods of manufacturing paint roller covers by manufacturing paint rollers without using a separately provided core member, thereby affording it the broadest possible market. Finally, all of the aforesaid advantages and aspirations of the paint roller cover manufacturing method of the present invention are achieved without incurring any substantial relative disadvantage.

Although the foregoing description of the paint roller cover manufacturing method of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

What is claimed is:

1. A method of manufacturing a paint roller cover, comprising:
   providing a tubular knitted pile fabric sleeve having a first end and a second end, said tubular knitted pile fabric sleeve comprising:
      a base fabric being knitted from a base strand and having a tubular configuration defining an outside and an inside; and
      pile strands knitted into said base fabric and extending inwardly from said base fabric to form the pile of said tubular knitted pile fabric sleeve;
   wherein at least one of said base strand and said pile strands is made at least in part from a first material and a second material, wherein said first material has a lower melting point than said second material and wherein the second material has a predetermined shrinkage rate when heated to said lower melting point;

inverting a first length of said tubular knitted pile fabric sleeve from a pile side-in configuration to a pile side-out configuration;

placing said inverted first length of said tubular knitted pile fabric sleeve onto a cylindrical member having a cylindrical outer surface with said inside of said base fabric in contact with said cylindrical outer surface of said cylindrical member;

heating said base fabric to cause at least a portion of said first material to melt and fuse said base fabric together to thereby create a cylindrical integral core member which, when cooled, is sufficiently rigid to preserve its cylindrical configuration and removing said cylindrical integral core member from said cylindrical member.

2. A method as defined in claim 1, wherein said tubular knitted pile fabric sleeve comprises:

a sliver knit tubular knitted pile fabric sleeve wherein said pile strands comprise tufts of sliver fibers.

3. A method as defined in claim 1, wherein said tubular knitted pile fabric sleeve comprises:

a knit tubular knitted cut pile fabric sleeve wherein said pile strands comprise cut pile yarn segments.

4. A method as defined in claim 1, wherein said tubular knitted pile fabric sleeve comprises:

a tubular knitted fabric sleeve wherein said pile strands comprise tufts of sliver fibers and cut pile yarn segments.

5. A method as defined in claim 1, wherein said base strand and said pile strands comprises at least one bicomponent fiber comprising:

a first bicomponent fiber material having a first melting point; and a second bicomponent fiber material having a second melting point that is lower than said first melting point, wherein the second bicomponent fiber material has a predetermined shrinkage rate when heated to said second melting point.

6. A method as defined in claim 5, wherein said at least one bicomponent fiber is arranged and configured with a sheath made of said second bicomponent fiber material that surrounds a core made of said first bicomponent fiber material.

7. A method as defined in claim 5, wherein said at least one bicomponent fiber is arranged and configured with a sheath made of said first bicomponent fiber material that surrounds a core made of said second bicomponent fiber material.

8. A method as defined in claim 5, wherein said at least one bicomponent fiber is arranged and configured with segments of said first and second bicomponent fiber material respectively located in a side-by-side arrangement.

9. A method as defined in claim 5, wherein said at least one bicomponent fiber is arranged and configured with a plurality of strands made of said first bicomponent fiber material that are surrounded by a sheath made of said second bicomponent fiber material.

10. A method as defined in claim 5, wherein said first bicomponent fiber material is selected from the group of materials consisting of polyester and polypropylene.

11. A method as defined in claim 5, wherein said second bicomponent fiber material is selected from the group of materials consisting of polyethylene terephthalate (PET), polyethylene, and copolyester.

12. A method as defined in claim 1, wherein at least one of said base strand and said pile strands comprises a bicomponent yarn comprising:

at least one fiber made of a first material having a first melting point; and at least one fiber made of a second material having a second melting point that is lower than said first melting point.

13. A method as defined in claim 1, wherein said base strand and said pile strands comprise at least in part a low melt material.

14. A method as defined in claim 13, wherein said base strand and said pile strands comprise different low melt materials.

15. A method as defined in claim 1, wherein said wherein said base strand comprises a yarn having a linear mass density of between approximately 150 denier and approximately 1500 denier.

16. A method as defined in claim 1, wherein said inverted tubular knitted pile fabric sleeve has an inner diameter that is larger than or approximately the same size as the outer diameter of said cylindrical member.

17. A method as defined in claim 1, wherein said inverted tubular knitted pile fabric sleeve and said cylindrical member are both longer than the length of a paint roller cover.

18. A method as defined in claim 1, additionally comprising:

cutting said integral core member into a plurality of unfinished paint roller covers each covered with knitted pile fabric having pile extending outwardly therefrom and each having edges located at opposite ends thereof.

19. A method as defined in claim 1, wherein said inverted tubular knitted pile fabric sleeve is of a length that is sufficiently long such that following said heating step said integral core member will be substantially the length needed to produce a paint roller cover of the desired length.

20. A method as defined in claim 1, wherein said cylindrical member comprises:

a hollow cylindrical aluminum heating tube having a non-stick outer surface.

21. A method as defined in claim 20, wherein said aluminum heating tube has an outer diameter that is substantially identical to a desired inner diameter of a finished paint roller cover.

22. A method as defined in claim 20, wherein said heating step comprises:

placing the aluminum heating tube with the tubular knitted pile fabric sleeve located thereupon onto a preheated mandrel heating assembly; and after a predetermined period of time, removing said aluminum heating tube from said mandrel heating assembly and allowing said integral core member to cool.

23. A method as defined in claim 22, wherein said mandrel heating assembly is preheated to a temperature that is sufficient to cause said first material to melt and conform to the size of said outer diameter of said aluminum heating tube.

24. A method as defined in claim 23, wherein said mandrel heating assembly is preheated to a temperature that is less than 650 degrees Fahrenheit (343 degrees Celsius).

25. A method as defined in claim 23, wherein said mandrel heating assembly is preheated to a temperature that is less than 450 degrees Fahrenheit (232 degrees Celsius).

26. A method as defined in claim 22, wherein said predetermined time is sufficient time for said first material to melt and fuse said base fabric and looped ends of said pile strands together to cause said first material to melt and conform to the size of said outer diameter of said aluminum heating tube.

27. A method as defined in claim 26, wherein said predetermined time is between approximately five seconds and approximately ninety seconds.

28. A method as defined in claim 1, additionally comprising:
placing a segment of dry adhesive film onto said cylindrical outer surface of said cylindrical member before said tubular knitted pile fabric sleeve is placed onto said cylindrical member, said tubular knitted pile fabric sleeve thus being located over said segment of dry adhesive film on said cylindrical outer surface of said cylindrical member;
wherein said dry adhesive film melts at least in part and fuses with said base fabric.

29. A method as defined in claim 28, wherein said dry adhesive film is between approximately 0.0005 inches (0.0127 millimeters) and 0.01 inches (0.254 millimeters) thick.

30. A method as defined in claim 1, additionally comprising:
applying a liquid adhesive layer onto said cylindrical integral core member of said tubular knitted pile fabric sleeve and allowing said adhesive layer to dry.

31. A method as defined in claim 1, wherein said tubular knitted pile fabric sleeve has edges located at said first and second ends thereof, said method additionally comprising:
combing said pile of said tubular knitted pile fabric sleeve extending from said integral core member;
shearing said pile of said tubular knitted pile fabric sleeve extending from said integral core member to the desired length;
beveling said edges of said tubular knitted pile fabric sleeve extending from said integral core member; and
vacuuming said pile of said knitted pile fabric extending from said integral core member.

32. A method as defined in claim 1, additionally comprising:
cutting said tubular knitted pile fabric sleeve extending from said integral core member into a plurality of unfinished paint roller covers each of a desired length;
combing said pile of said knitted pile fabric on said unfinished paint roller covers;
shearing said pile of said knitted pile fabric on said unfinished paint roller covers to the desired length;
beveling said edges of said unfinished paint roller covers; and
vacuuming said pile of said unfinished paint roller covers.

33. A method of manufacturing a paint roller cover, comprising:
providing a tubular knitted pile fabric sleeve having a first end and a second end, said tubular knitted pile fabric sleeve comprising:
a base fabric having a tubular configuration defining an outside and an inside;
pile strands knitted into said base fabric and extending inwardly from said base fabric to form the pile of said tubular knitted pile fabric sleeve;
wherein at least one of said base fabric and said pile strands comprise bicomponent fiber having a first material and a second material, wherein said first material has a lower melting point than said second material;
inverting said tubular knitted pile fabric sleeve from a pile side-in configuration to a pile side-out configuration;
preheating a mandrel heating assembly to a temperature that is sufficient to cause said first material to melt;
placing the inverted tubular knitted pile fabric sleeve on a heating tube;
placing the heating tube with the inverted tubular knitted pile fabric sleeve located thereupon onto the mandrel heating assembly to heat said base fabric to cause at least a portion of said first material to melt and fuse said base fabric and said pile strands together to thereby create a cylindrical integral core member; and
removing said heating tube from said mandrel heating assembly and allowing said integral core member to cool, said cylindrical integral core member, when cooled, having sufficient rigidity to preserve its cylindrical configuration.

34. A method of manufacturing a paint roller cover, comprising:
providing a tubular knitted pile fabric sleeve comprising:
a tubular base fabric; and
extending inwardly pile strands knitted into said base fabric, wherein at least one of said tubular base fabric and said pile strands comprise at least in part a bicomponent fiber;
inverting said tubular knitted pile fabric sleeve from a pile side-in configuration to a pile side-out configuration;
placing said tubular knitted pile fabric sleeve onto a cylindrical member;
heating said base fabric to cause said bicomponent material to melt at least in part and fuse together to thereby create a cylindrical integral core member so that, when cooled, said tubular base fabric remains in a cylindrical configuration; and
removing said cylindrical integral core member from said cylindrical member.

* * * * *